(12) United States Patent
Scianamblo

(10) Patent No.: US 11,980,521 B1
(45) Date of Patent: May 14, 2024

(54) ENDODONTIC INSTRUMENTS

(71) Applicant: Michael J. Scianamblo, Fort Lauderdale, FL (US)

(72) Inventor: Michael J. Scianamblo, Fort Lauderdale, FL (US)

(*) Notice: Subject to any disclaimer, the term of this patent is extended or adjusted under 35 U.S.C. 154(b) by 0 days.

(21) Appl. No.: 18/215,693

(22) Filed: Jun. 28, 2023

(51) Int. Cl.
*A61C 5/42* (2017.01)
*A61C 1/06* (2006.01)
*A61C 5/40* (2017.01)

(52) U.S. Cl.
CPC ............... *A61C 5/40* (2017.02); *A61C 1/06* (2013.01); *A61C 5/42* (2017.02)

(58) Field of Classification Search
CPC ........................................................ A61C 5/42
See application file for complete search history.

(56) References Cited

U.S. PATENT DOCUMENTS

| 6,942,484 | B2 | 9/2005 | Scianamblo |
| 7,094,056 | B2 | 8/2006 | Scianamblo |
| 7,955,078 | B2 | 6/2011 | Scianamblo |
| 8,454,361 | B2 | 7/2013 | Scianamblo |
| 8,496,476 | B2 | 7/2013 | Scianamblo |
| 8,882,504 | B2 | 11/2014 | Scianamblo |
| 8,932,056 | B2 | 1/2015 | Scianamblo |
| D750,246 | S | 2/2016 | Scianamblo |
| 9,351,803 | B2 | 5/2016 | Scianamblo |
| 2013/0337407 | A1* | 12/2013 | Mordeniz ............... A61C 5/42 433/102 |
| 2015/0216624 | A1* | 8/2015 | Shotton ................... A61C 5/42 433/102 |
| 2015/0320517 | A1* | 11/2015 | Rota ....................... A61C 5/42 433/102 |
| 2017/0209236 | A1* | 7/2017 | Scianamblo ............ A61C 5/40 |

FOREIGN PATENT DOCUMENTS

CN 111098101 A * 5/2020 ............. A61C 5/42

* cited by examiner

Primary Examiner — Heidi M Eide
(74) Attorney, Agent, or Firm — Fish & Richardson P.C.

(57) ABSTRACT

Endodontic instruments are used to clean and enlarge the endodontic cavity space (ECS), also known as the root canal system, of a human tooth. This document describes novel endodontic instruments that are radially compressible, and methods for their use.

28 Claims, 29 Drawing Sheets

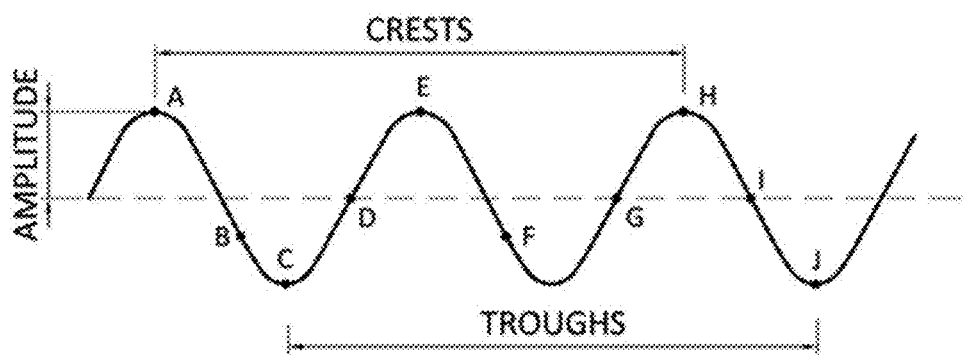
FIG. 1
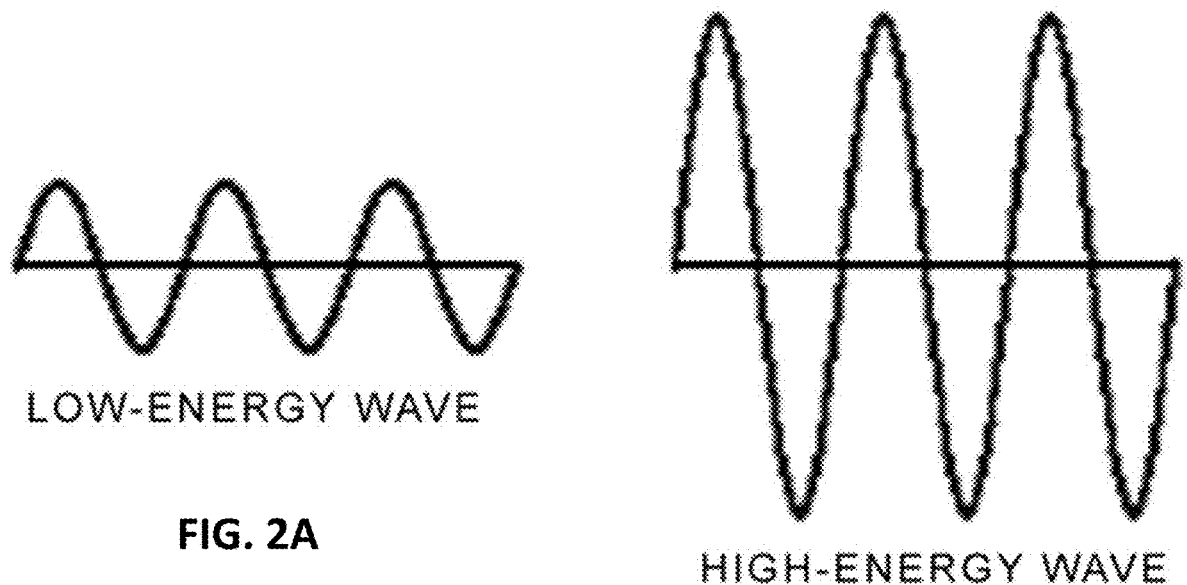
FIG. 2A
FIG. 2B

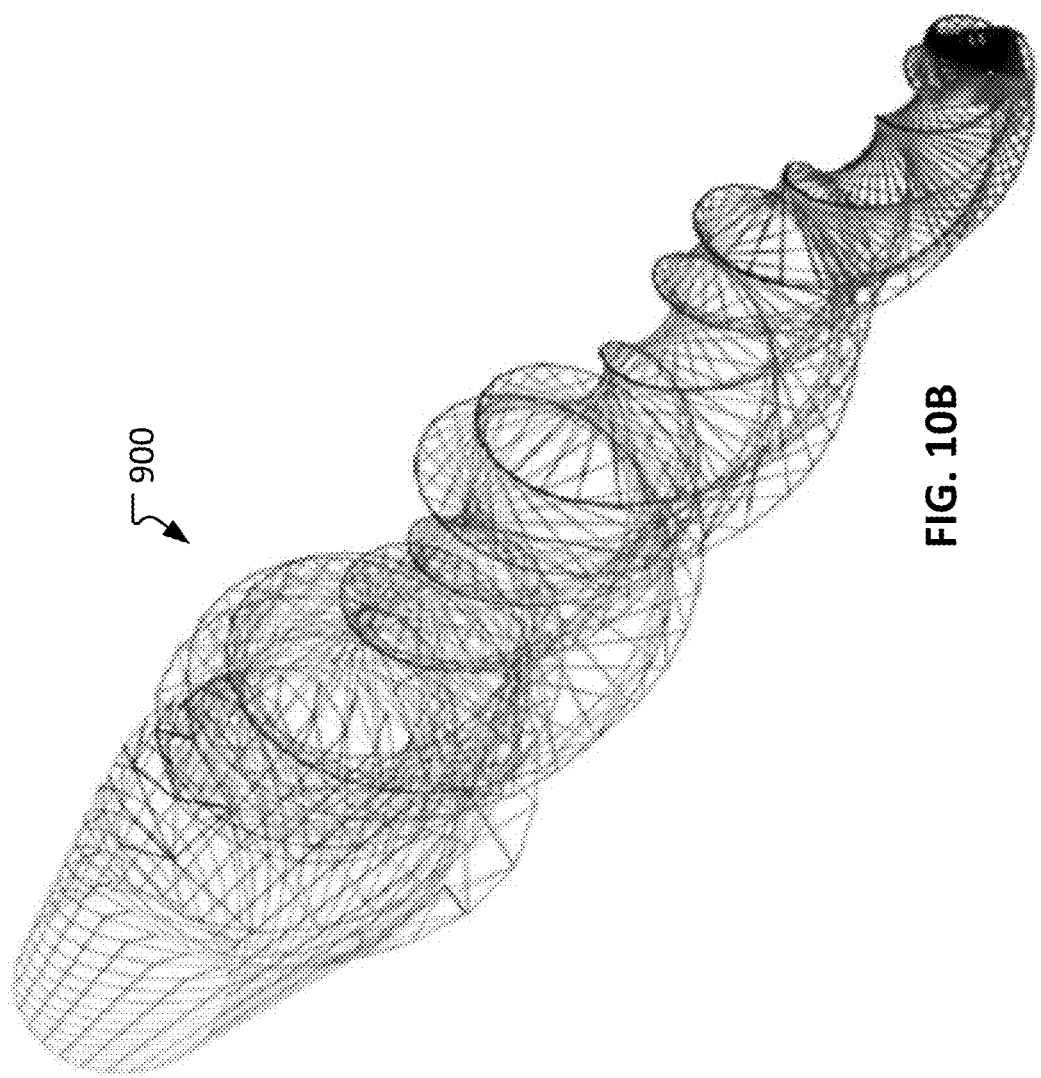
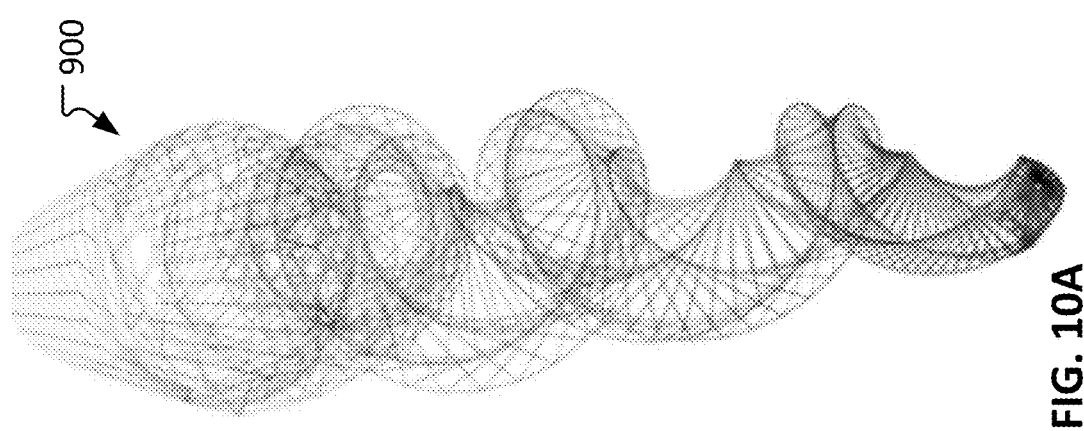
FIG. 10B
FIG. 10A

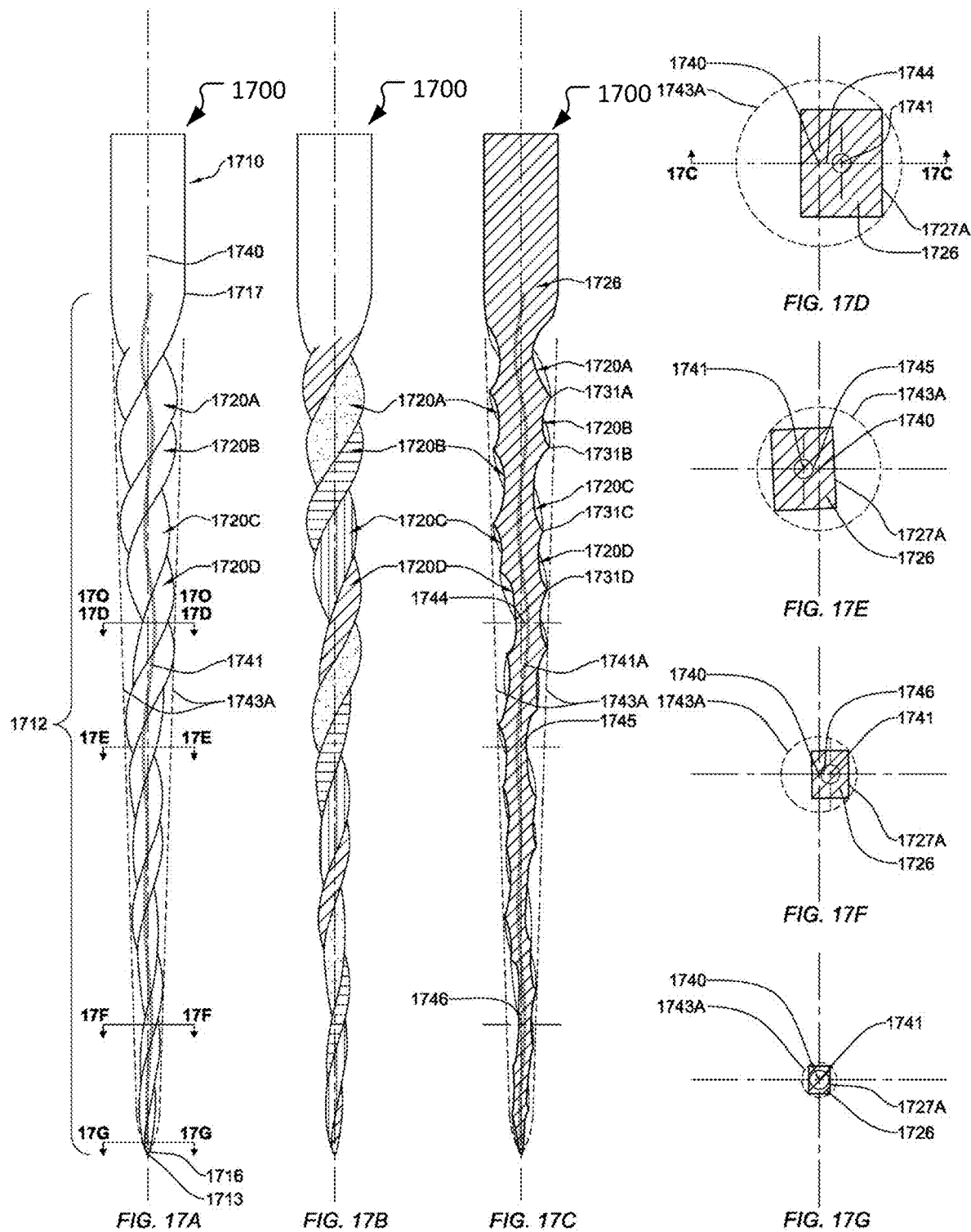

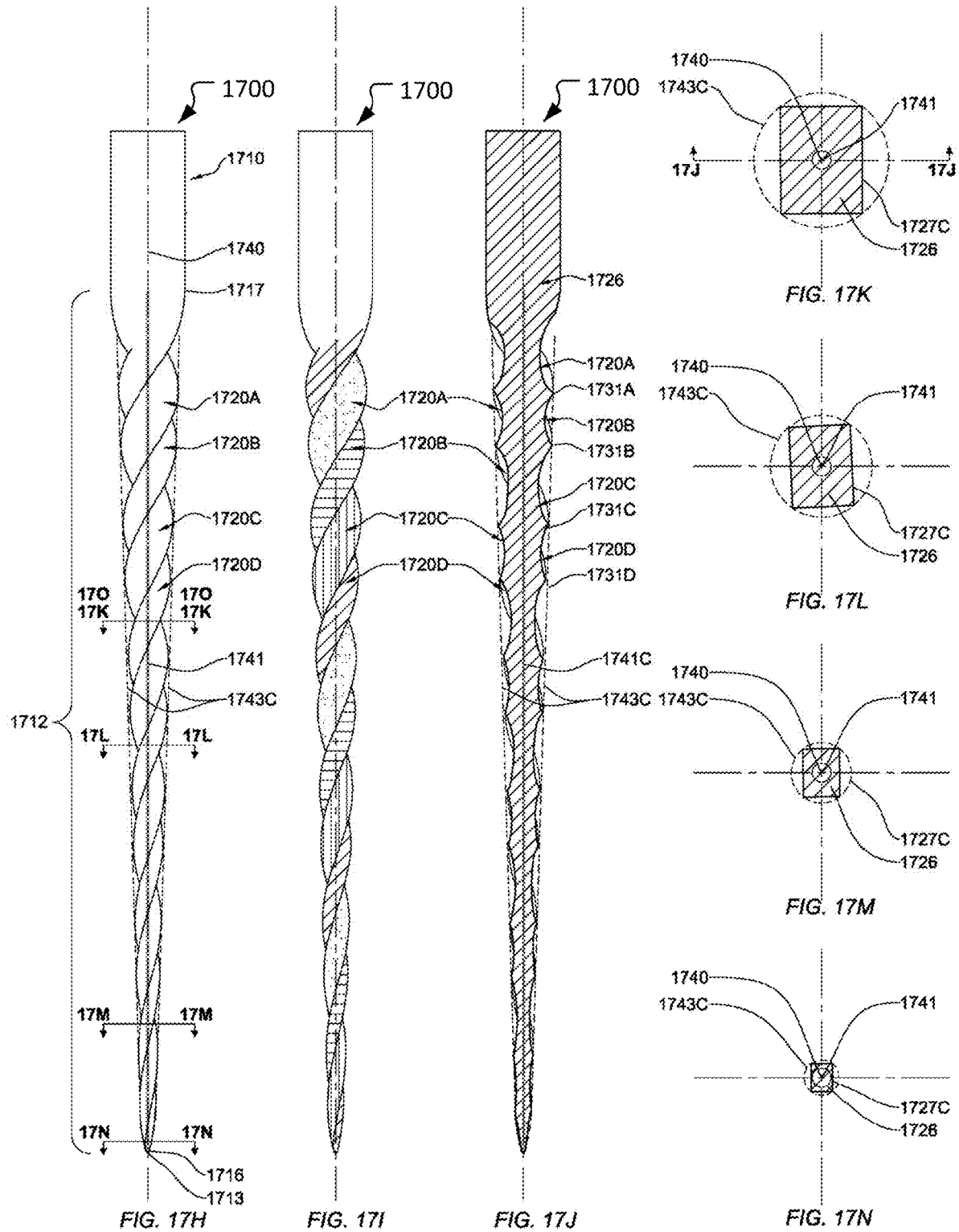

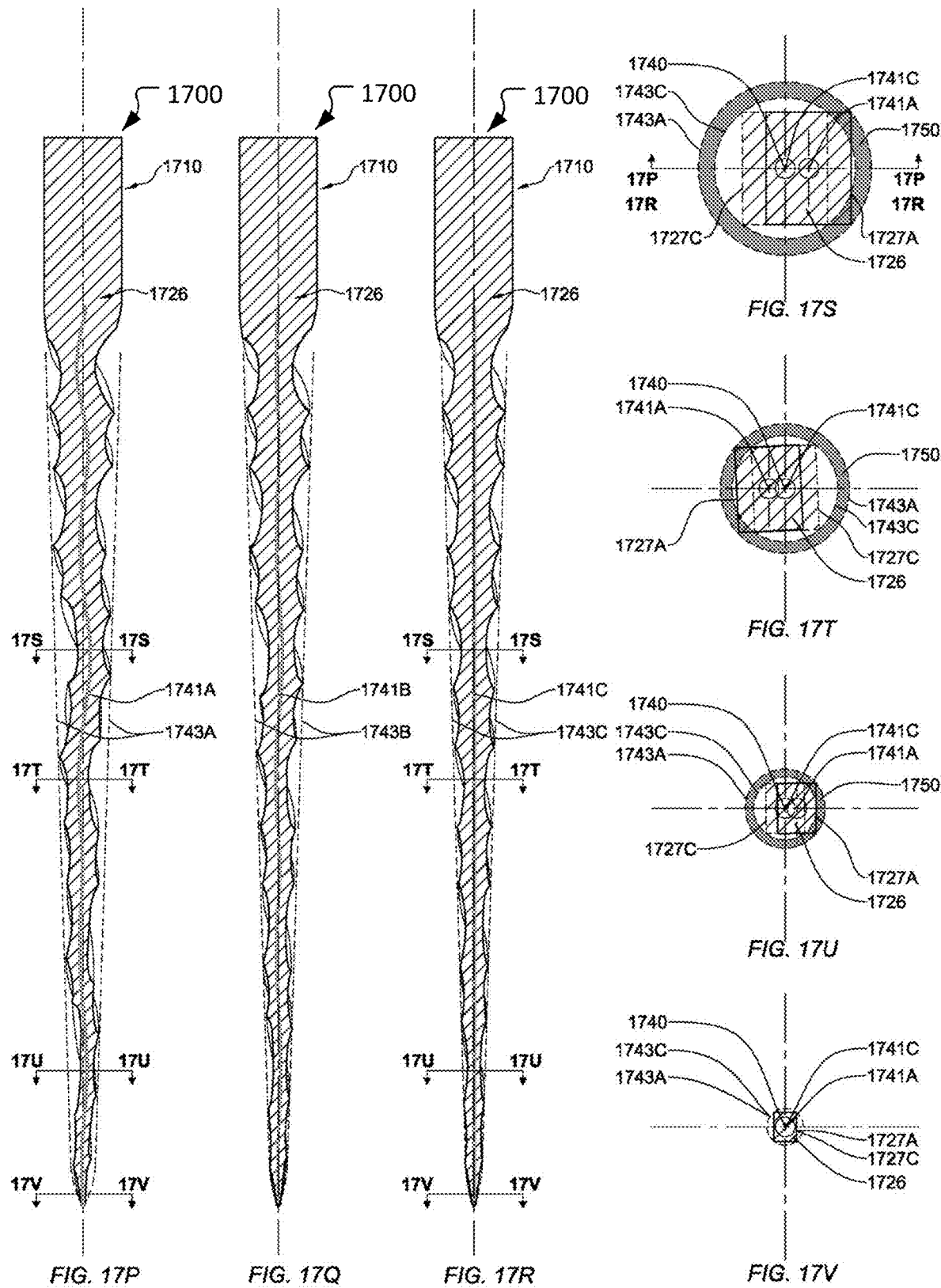

ENDODONTIC INSTRUMENTS

BACKGROUND

1. Technical Field

This document relates to endodontic instruments and methods for their use. For example, this document relates to novel endodontic instruments that are radially compressible and methods for their use.

2. Background Information

Endodontic instruments can be used for cleaning and enlarging the endodontic cavity space (ECS), also known as the root canal system of a human tooth. Much of the background of endodontic instrument design and development, including numerous improvements in design and functionality, has been described by the Applicant in detail in previous patent applications and grants, such as: U.S. Pat. No. 9,351,803 (titled "Endodontic Instruments with Offset Centers of Mass), U.S. Pat. No. D750,246 (titled "Endodontic Device"), U.S. Pat. No. 8,932,056 (titled "Swaggering Endodontic Instruments"), U.S. Pat. No. 8,882,504 (titled "Swaggering Endodontic Instruments"), U.S. Pat. No. 8,496,476 (titled "Endodontic Instruments for Preparing Endodontic Cavity Spaces"), U.S. Pat. No. 8,454,361 (titled "Swaggering Endodontic Instruments"), U.S. Pat. No. 7,955,078 (titled "Endodontic Instruments for Preparing Endodontic Cavity Spaces"), U.S. Pat. No. 7,094,056 (titled "Endodontic Instrument having Reversed Helix"), and U.S. Pat. No. 6,942,484 (titled "Critical Path Endodontic Instruments for Preparing Endodontic Cavity Spaces").

SUMMARY

This document describes endodontic instruments and methods for their use. For example, this document describes novel endodontic instruments that are radially compressible, and methods for their use.

In one aspect, this document is directed to an endodontic instrument that includes a shank configured for attachment to a motor to drive the endodontic instrument about a first axis; and a body extending from the shank by a length. The spirally shaped body is solid and has a working surface between: (i) a shank end where the working surface and the shank meet and (ii) a tip end. The working surface includes multiple edges. At least a portion of the working surface is tapered such that the tip end has a diameter that is less than a diameter of the shank end. The working surface comprises a plurality of transverse cross-sections. Each transverse cross-section has a center of mass and multiple sides. The working surface has a center of mass path defined by the centers of mass of the plurality of transverse cross-sections of the spirally shaped body. At least a portion of the center of mass path between the tip end and the shank end spirals around the first axis along a length of the first axis. A center of mass of a transverse cross-section of the working surface at the shank end is offset from the first axis.

Such an endodontic instrument may optionally include one or more of the following features. The spirally shaped body may be configured such that when the endodontic instrument is driven within the endodontic cavity space about the first axis, at each transverse section of at least a portion of the length of the spirally shaped body, one or more edges of the multiple edges are out of contact with a wall of the endodontic cavity space. The working surface may include a reversed helix. The portion of the center of mass path that spirals around the first axis may extend from the tip end to the shank end. The plurality of transverse cross-sections may include a transverse cross-section that is quadrilateral. Each of the plurality of transverse cross-sections may be quadrilateral. A ratio of lengths of sides of the quadrilateral may remain constant along the length of the spirally shaped body. The plurality of transverse cross-sections may include a transverse cross-section at the tip end that has a center of mass that coincides with the first axis. The plurality of transverse cross-sections may include a transverse cross-section that is triangular. The plurality of transverse cross-sections may include a transverse cross-section that is asymmetrical. The plurality of transverse cross-sections may include a first transverse cross-section and a second transverse cross-section. The first transverse cross-section may have a first geometry, and the second transverse cross-section may have a second geometry different from the first geometry. Each transverse cross-section between the first transverse cross-section and the second transverse cross-section may have a gradually changing geometry with respect to each other. The spirally shaped body may comprise nickel-titanium. The plurality of transverse cross-sections may include a first transverse cross-section and a second transverse cross-section. A center of mass of the first transverse cross-section may be spaced apart from the first axis by a first distance, a center of mass of the second transverse cross-section may be spaced apart from the first axis by a second distance, and the first distance may be greater than the second distance. Each transverse cross-section of the spirally shaped body may be define by a polygonal shape. A ratio of lengths of sides of the polygonal shape may vary along the length of the spirally shaped body. The plurality of transverse cross-sections may include a transverse cross-section at the tip end that has a center of mass that coincides with the first axis.

In another aspect, this disclosure is directed to a method of preparing an endodontic cavity space. The method includes inserting an instrument into the endodontic cavity space; and rotating the instrument about its axis of rotation while the instrument is in the endodontic cavity space. During the rotating the instrument is radially compressed by a wall of the endodontic cavity space.

Such a method may optionally include one or more of the following features. The instrument may include a shank configured for attachment to a motor to drive the endodontic instrument about a first axis; and a body extending from the shank by a length. The spirally shaped body may be solid and has a working surface between: (i) a shank end where the working surface and the shank meet and (ii) a tip end. The working surface may include multiple edges. At least a portion of the working surface may be tapered such that the tip end has a diameter that is less than a diameter of the shank end. The working surface comprises a plurality of transverse cross-sections. Each transverse cross-section may have a center of mass and multiple sides. The working surface may have a center of mass path defined by the centers of mass of the plurality of transverse cross-sections of the spirally shaped body. At least a portion of the center of mass path between the tip end and the shank end may spiral around the first axis along a length of the first axis. A center of mass of a transverse cross-section of the working surface at the shank end may be offset from the first axis. During the rotating the instrument may be radially compressed by the wall of the endodontic cavity space such that the center of mass path is nearer to the axis of rotation than prior to the inserting. During the rotating, one or more edges of the multiple edges may be out of contact with the wall of the endodontic cavity space.

Particular embodiments of the subject matter described in this document can be implemented to realize one or more of the following advantages. In some embodiments, the endodontic instruments described herein can provide more efficient endodontic procedures, and endodontic procedures that are safer for a patient. In some cases, the endodontic instruments described herein are radially compressible, and therefore the efficiency of a procedure can be increased using a single instrument that can advantageously be used in place of a series of multiple instruments of increasing sizes. In some embodiments, the instruments described herein can be made to have a smaller diameter than the space that requires cleaning, thereby allowing for difficult to access areas to be accessed. An instrument that is both flexible and strong resists breaking and injuring the patient. In some embodiments, the instruments are flexible and have a center of mass offset from an axis of rotation that may advantageously swing out from the axis of rotation as the instrument is rotated at high speeds, such as when the instrument is used with a motorized actuator tool.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described herein. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description herein. Other features, objects, and advantages of the invention will be apparent from the description and drawings, and from the claims.

DESCRIPTION OF THE DRAWINGS

FIG. 2A depicts an example low-energy wave pattern.

FIG. 2B depicts an example high-energy wave pattern.

FIGS. 10A and 10B are perspective wire-frame illustrations of the endodontic instrument of FIG. 9.

FIGS. 17A and 17B depict another example endodontic instrument.

FIG. 17C is a longitudinal cross-sectional view of the endodontic instrument of FIGS. 17A and 17B.

FIGS. 17D-17G depict cross-sectional views of the endodontic instrument of FIGS. 17A and 17B at cutting-plane lines 17D-17D, 17E-17E, 17F-17F, and 17G-17G respectively.

FIGS. 17H-17N correspond to FIGS. 17A-17G while the endodontic instrument is fully radially constrained.

FIG. 17O-1 depicts the cross-section of FIG. 17O in a fully radially constrained condition.

FIGS. 17P-17R depict another example endodontic instrument longitudinal cross-sectional and at varying conditions of diametrical constraint.

FIGS. 17S-17V depict cross-sectional views of the endodontic instrument of FIGS. 17P and 17Q at cutting-plane lines 17S-17S, 17T-17T, 17U-17U, and 17V-17V respectively.

Like reference numbers represent corresponding parts throughout.

DETAILED DESCRIPTION

Figure 3:
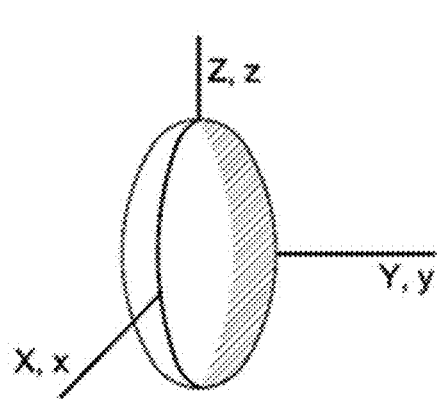
FIGS. 3-5 depict an object undergoing angular rotations about various axes.

This document describes endodontic instruments and methods for their use. For example, this document describes novel endodontic instruments that are radially compressible, and methods for their use.

Traditional endodontic instrument designs have a center of rotation and a center of mass that are essentially identical, dictating a linear trajectory or path of motion. These designs facilitate elastic memory and the restoration of the original endodontic instrument shape.

The recent use of nickel-titanium in the manufacture of endodontic instruments, further facilitates this function. Restoration of the original shape of the endodontic instrument has been thought to be of paramount importance during root canal preparation, whereby the restoring force can be pitted against the balancing force as described by Roane et al (1985). However, research by the inventor of this disclosure has indicated that it is this precise function that prevents the instruments from contacting an entirety of the root canal walls, leaving as much as 35% of the internal anatomy of the canal untouched and the preparation poorly centered.

In addition, the continuous contact of the flutes of the endodontic instrument with the canals walls of the canal and the concomitant binding of the instrument, predisposes the instruments to cyclic fatigue and subsequent instrument failure and breakage.

An alternative approach to traditional instruments designed with a coincident center of rotation and center of mass are instruments that have an "off-set" cross-sectional center of mass from the center or axis of rotation. These instruments have been described as swaggering endodontic instruments (e.g., see U.S. Pat. Nos. 8,454,361, 8,882,504, and 8,932,056), but such instruments may also be defined as instruments that cut with a precessional axis.

In some embodiments, when the center of mass of the cross-sectional area of an endodontic instrument is sufficiently off-set from the instrument's axis of rotation, and the vector for centripetal force overtakes the spring constant, the cutting motion is no longer linearly, but helically producing a transverse mechanical wave. These have been termed swaggering endodontic instruments, which will cut precessionally. As with any wave traveling through a medium, a crest is seen moving from point to point. This crest is followed by a trough, which is in turn is followed by the next crest. In the case of a swaggering endodontic instrument, these waves are necessarily created by a disturbance or excitation force, which is usually produced by a dental hand piece. The mechanism by which a wave propagates itself through the metal of the endodontic instrument involves particle interaction, whereby one particle applies a push or pull on an adjacent particle, causing a displacement of the adjacent particle and its dislocation from rest. For the purpose of this disclosure, this can be termed "bodily movement" of the endodontic instrument, and can be reproduced and videoed experimentally. Bodily movement can be engendered using several design nuances, previously described in earlier patent applications and grants (see above).

In some embodiments provided herein, a transverse or cyclical wave pattern can be engendered by grinding or "inscribing" the precessional axis into the metal of the endodontic instrument itself. The wave pattern here is similar, but bodily movement (i.e., instrument displacement owing to deflection) of the endodontic instrument may be absent. As with any wave traveling through a medium, a crest is seen moving along from point to point. This crest is followed by a trough, which is in turn is followed by the next crest. There are many wave patterns that can be identified in nature. The wave pattern relevant here are transverse or mechanical waves exclusively.

An example of a transverse or mechanical wave can be seen manipulating a skip rope. If one ties the loose end of a long rope to a stationary point, stretches the rope out horizontally, and then gives the end being held an up-and-down transverse motion, which can be called the excitation force (Fe), the result is a continuous wave pulse that travels along the length of the rope to its the tied end. Observation shows that the pulse travels with a definite speed, maintaining its shape as it travels, and that the individual segments making up the rope move back and forth in a direction perpendicular to the rope's equilibrium position. In physics, this principle can be derived mathematically from the formula $y=f(x, t)$. Here, the equilibrium position is selected along the x-axis (corresponding to the stretched rope), and the transverse or perpendicular displacement is selected along the y-axis, which is the maximum displacement of the rope, or amplitude. Thus, y is a function of both x (the undisplaced position of the point) and time t. This is called the wave function.

At any time t, if one takes a picture of the instantaneous shape of the rope, it will be observed that y varies sinusoidally with x. FIG. 1 depicts a transverse wave which consists of oscillations occurring perpendicular or at right angles to the direction of the wave. The waves are composed of crests and troughs with a specific amplitude that determines the energy or force transmitted by each wave.

In the first application, once an upwards and downwards excitation force is introduced into the rope, the particles of the rope also begin to oscillate upwards and downwards. At any given moment in time, a particle on the rope could be above or below the rest position. Points A, E and H on the transverse wave represent maximum amount of positive or upward displacement from the rest position. The troughs of a wave C and J are the points on the transverse wave which exhibits the maximum amount of negative or downwards displacement from the rest position.

The amount of energy carried by a wave is related to the amplitude of the wave. Putting more energy into a transverse pulse will not affect the wavelength, the frequency or the speed of the pulse. The energy imparted to a pulse will only affect the amplitude of that pulse. The more energy imparted to the wave, the higher will be the corresponding amplitude as illustrated by a comparison of the waves of FIGS. 2A and 2B. Conversely, lesser values of imparted energy produce smaller amplitudes.

With regard to endodontic instruments that have a precessional axis is ground into the body of the endodontic instrument, the forgoing wave principles owing to physical deflection do not necessary apply in all cases, but may apply in some cases.

Precessional Cutting

Figure 4:
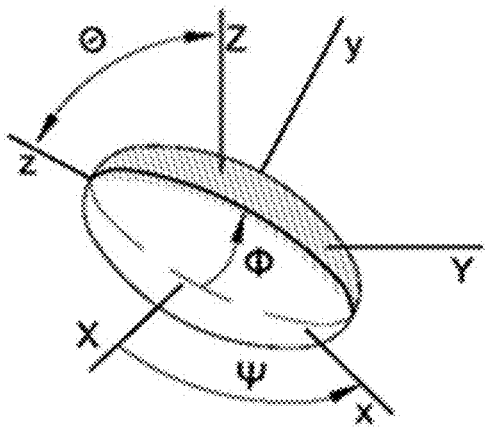

In order to better understand endodontic instruments that cut precessional, some brief background into geometry and mathematics is now provided. Eulerian angles are a set of angles used to describe the orientation of any object relative to a coordinate system. In order to develop these angles, it is assumed that an object has an axis of rotational symmetry and two reference frames: a secondary coordinate system xyz, whose z-axis is coincident with the object's axis of symmetry, and an inertial primary coordinate system XYZ. FIG. 3 shows the object in an initial position. The body is then put through a series of rotations to establish the Eulerian angles as shown in FIG. 4. The angles $\psi$ and $\Theta$ specify the orientation of the secondary xyz system relative to the primary XYZ system. $\Psi$ (psi) is called the precession angle and $\Theta$ (theta) is called the nutation angle. The angle $\varphi$ (phi) specifies the rotation of the rigid body relative to the xyz system and is called the spin angle. These three angles are called the Eulerian angles. The precession rate is the rate at which the xyz system rotates about the Z-axis, the precession axis.

Figure 5:
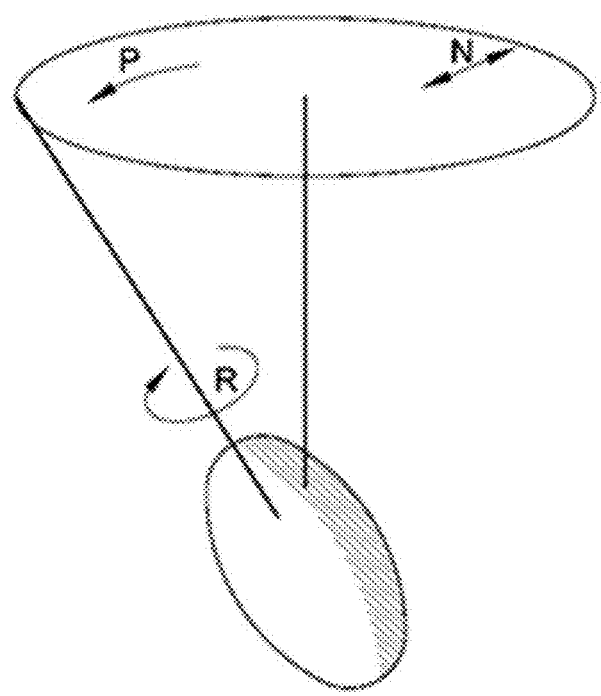

The Eulerian angles can then be used to develop equations of angular motion which describe mathematically the behavior of a rotating body in precession. The scope of the mathematics is complex and does not need to be addressed here, however, a general idea of the resulting motion of a body in precession is provided in FIG. 5. The body is rotating about its own axis, shown as R, while simultaneously rotating (precessing) about the central axis P. N represents the nutation of the body, which is a rocking or oscillation of the body itself as it precesses about the central axis, which can be considered negligible in this case.

Figure 6A:
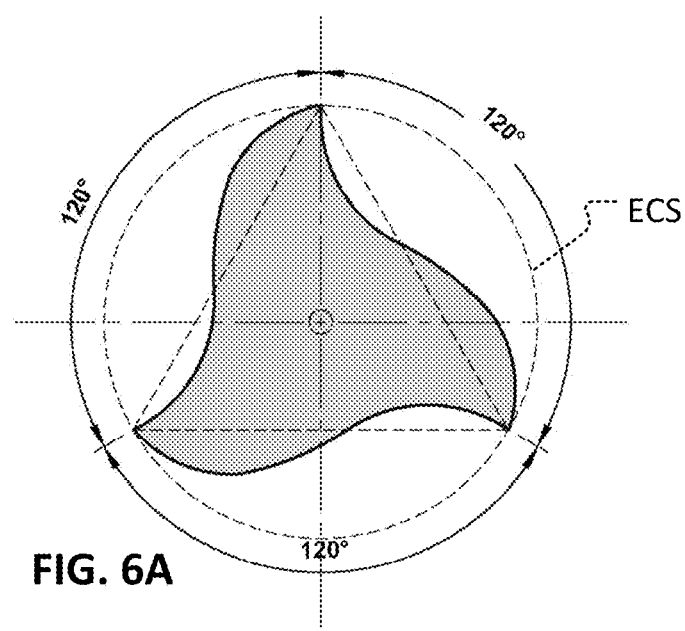
FIGS. 6A-6C depict cross-sectional views of the endodontic instrument of FIG. 6 at cutting-plane lines A—A, B—B, and C—C respectively.
Figure 6B:
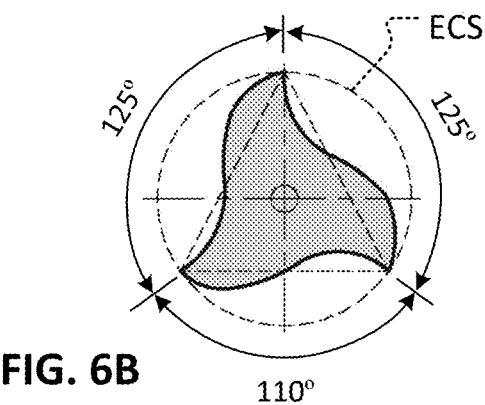
Figure 6C:
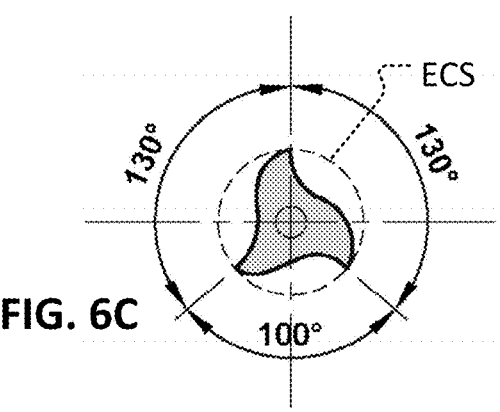
Figure 6:
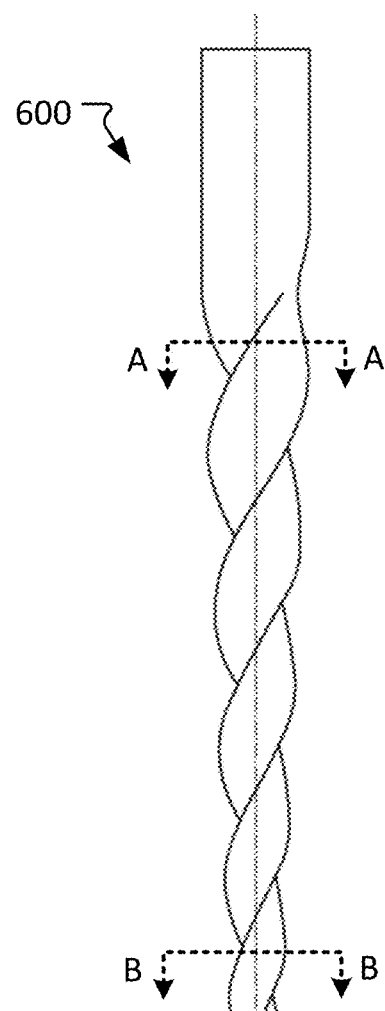
FIG. 6 depicts an example endodontic instrument.

As mentioned above, endodontic instruments that precess by off-setting the center of mass of the endodontic instrument from the center of rotation can be created in various ways. There are at least two fabrication methods that can be used to achieve this result. A first such fabrication method ("method 1") shifts the center of mass from the central axis, continuously, along its length using asymmetric cross-sections. An example of method 1 is shown by example endodontic instrument 600 in FIG. 6. In method 1, the endodontic instrument (e.g., endodontic instrument 600) is ground linearly along the central axis, but the cross section of the endodontic instruments varies asymmetrically along the length of the central axis. For example, in the depicted example the cross-sectional shape of endodontic instrument 600 is an equilateral triangle at cross-section A-A (FIG. 6A), and the cross-sectional shape increasingly becomes an isosceles triangle along the body of the instrument in the direction toward the tip (see FIGS. 6B and 6C). This same concept can be applied utilizing instruments with other asymmetric cross-sections, for example a trapezoidal cross-section. In these examples, bodily movement (from material deflection) is a function of the asymmetry and centripetal force, which defines the precession angle.

In a second fabrication method ("method 2") by which endodontic instruments can be made to operate using precessional motion, the cross-section of the endodontic instrument is symmetrical or bi-symmetrical and ground such that the center of mass of the cross-section is off-set at a distance away from the rotational axis. The off-set cross-section revolves around the central or rotational axis as it is being ground.

Figure 7A:
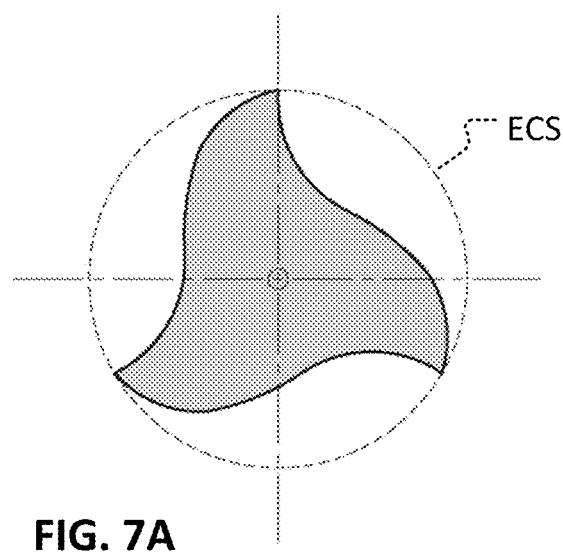
FIGS. 7A-7C depict cross-sectional views of the endodontic instrument of FIG. 7 at cutting-plane lines A—A, B—B, and C—C respectively.
Figure 7:
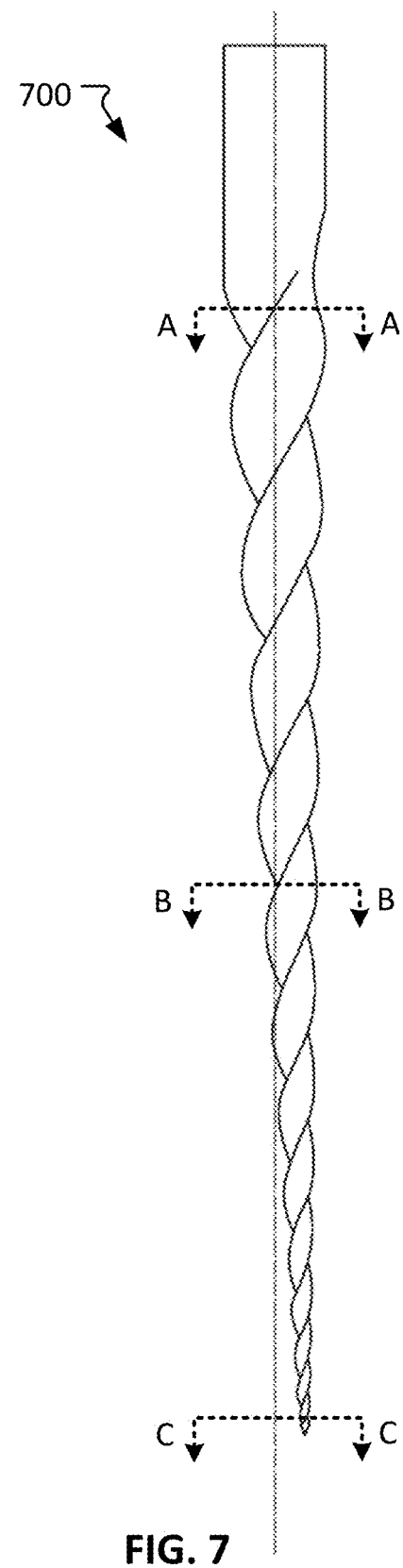
FIG. 7 depicts another example endodontic instrument.
Figure 7B:
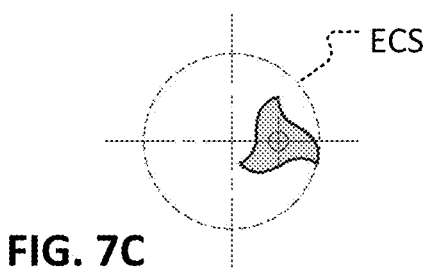
Figure 7C:
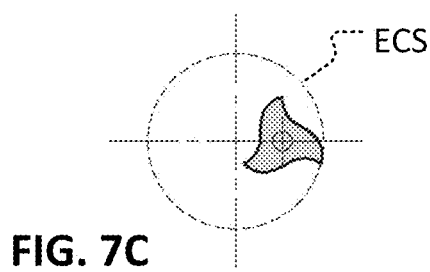
Figure 8A:
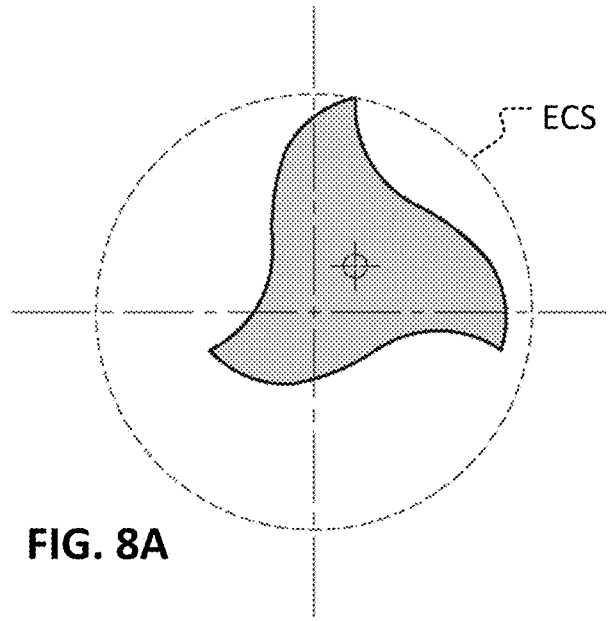
FIGS. 8A-8C depict cross-sectional views of the endodontic instrument of FIG. 8 at cutting-plane lines A—A, B—B, and C—C respectively.
Figure 8B:
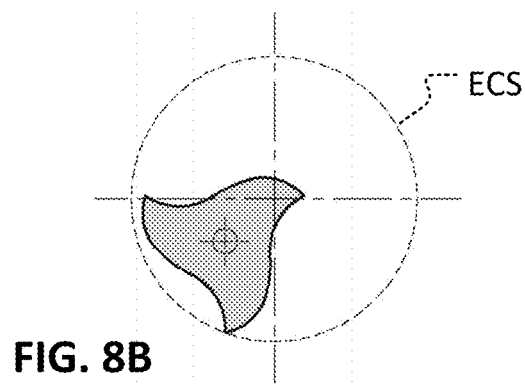
Figure 8C:
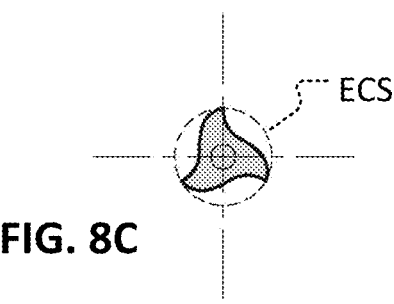
Figure 8:
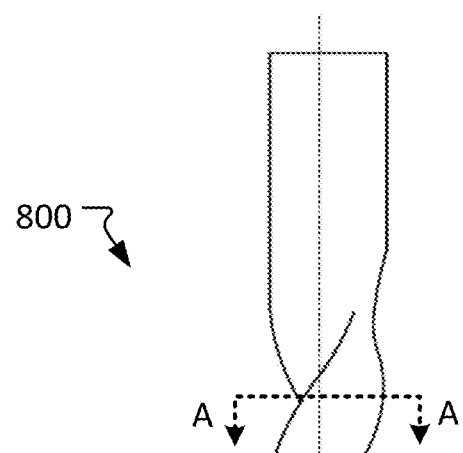
FIG. 8 depicts another example endodontic instrument.
Figure 8:
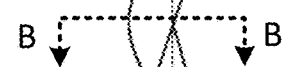
Figure 8:

As can be seen from FIGS. 7 and 8, for example, the distance between the centers of mass (centroids) of the cross-sections (which are off-set from the axis of rotation, or "offset" for simplicity) and the central axis of rotation varies along the length of the endodontic instrument. This offset distance may increase or decrease monotonously or can accelerate. Further, the offset can originate from the shank and extend progressively farther away from the central axis from the shank to the tip as depicted by endodontic instrument 700 (FIG. 7), or originate at the tip and extend progressively farther away from the central axis from the tip to the shank as depicted by endodontic instrument 800 (FIG. 8).

FIG. 8 illustrates an endodontic instrument 800 that has a spiral or corkscrew shape/profile. The cross-sections shown in FIGS. 8A and 8B further illustrate the spiral/corkscrew configuration of the endodontic instrument 800. The center of mass of the cross-sections are offset from the axis of rotation, and the center of mass path spirals around the axis of rotation along the length of the endodontic instrument 800. As shown in FIG. 8C, the tip of the endodontic instrument 800 is centered on the axis of rotation of the endodontic instrument 800.

Figure 9A:
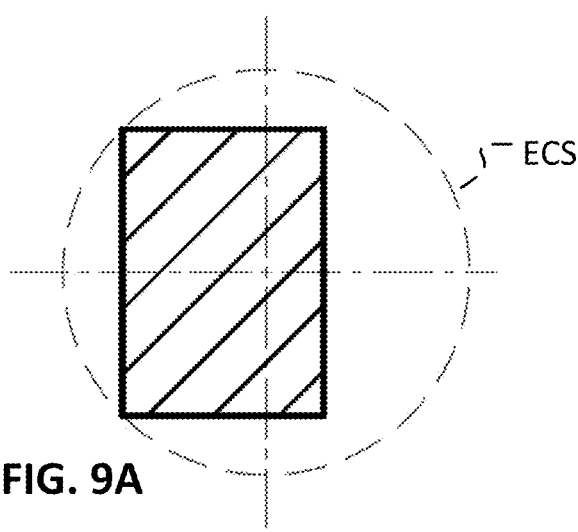
FIGS. 9A-9D depict cross-sectional views of the endodontic instrument of FIG. 9 at cutting-plane lines A—A, B—B, C—C, and D—D respectively.
Figure 9B:
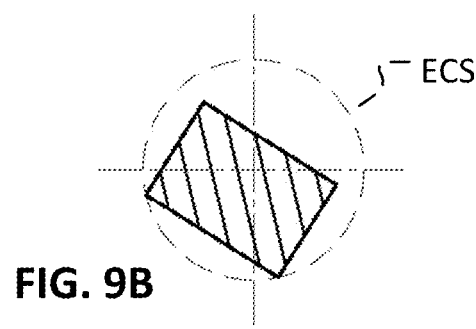
Figure 9C:
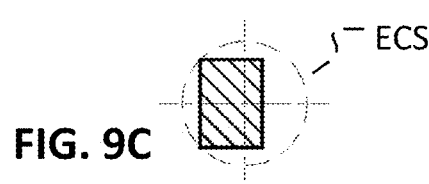
Figure 9D:
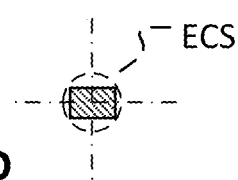
Figure 9:
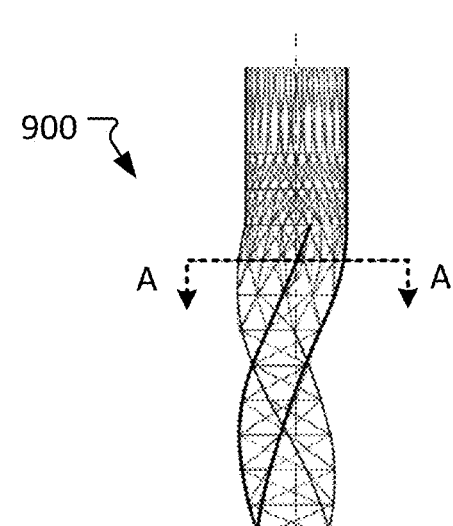
FIG. 9 depicts another example endodontic instrument.

FIG. 9 illustrates an example endodontic instrument 900 that has offset rectilinear cross sections that spiral around the axis of rotation (except at the tip where the cross-section in centered on the axis of rotation). For example, as shown in FIG. 9A, even the center of mass of the cross-section at the shank end of the working body of the instrument 900 is offset from the axis of rotation.

When the center of mass of the cross-section is offset from the axis of rotation, one or more of the edges of the instrument are out of contact with the wall of the ECS. For example, as shown in the examples of FIGS. 9A-9C, only two edges of the rectilinear cross-section engage the walls of the root canal at any one time. This offset rectilinear cross-section not only contributes to the innate flexibility of the endodontic instrument 900, but also permits intermittent cutting, which mitigates cyclic fatigue. The large clearance angle opposite the cutting flutes facilitate hauling and elimination of debris Example endodontic instrument 900 (which is configured using method 2 and depicted in wire-form in FIG. 9) has a cutting axis that is different than the rotational or central axis. The cutting axis is inscribed in (ground in) the instrument 900 by off-setting a rectilinear cross-section (in this example) from shank to tip. Again, the symmetrical, or in this case bi-symmetrical cross-section, can be seen revolving around the central axis, deploying only two cutting edges. In result, the path defined by the centers of mass of the cross-sections spiral around the axis of rotation of the instrument 900. The offset starts at the shank end of the working body (as shown in FIG. 9A) and become progressively less along the working body in a direction towards the tip. At the tip, the center of mass of the cross-section is coincident with the axis of rotation (as shown in FIG. 9D).

An instrument design using this configuration will precess in both the x-axis and the y-axis, similar to the asymmetric cross-section, without necessarily displaying any bodily deflection. An offset rectilinear cross section such as this, can contribute to the innate flexibility of the endodontic instrument 900, while permitting intermittent cutting, which will mitigate cyclic fatigue. In addition, the larger clearance angles opposite the cutting flutes will facilitate hauling and elimination of debris, further improving the resistance to cyclic fatigue.

FIGS. 10A and 10B are perspective images of the example endodontic instrument 900 demonstrating the spring, corkscrew, spiral, or coil-like configuration of the instrument 900 (and many other embodiments of the instruments described herein). In addition, when the cross-section is off-set at a significant or "threshold distance" away from the central axis, as shown in FIGS. 10A and 10B, one can visualization of the radial/diametrical "compressibility" of the endodontic instruments (such as endodontic instrument 900 and other instruments described herein), which will be described further below.

Figure 11A:
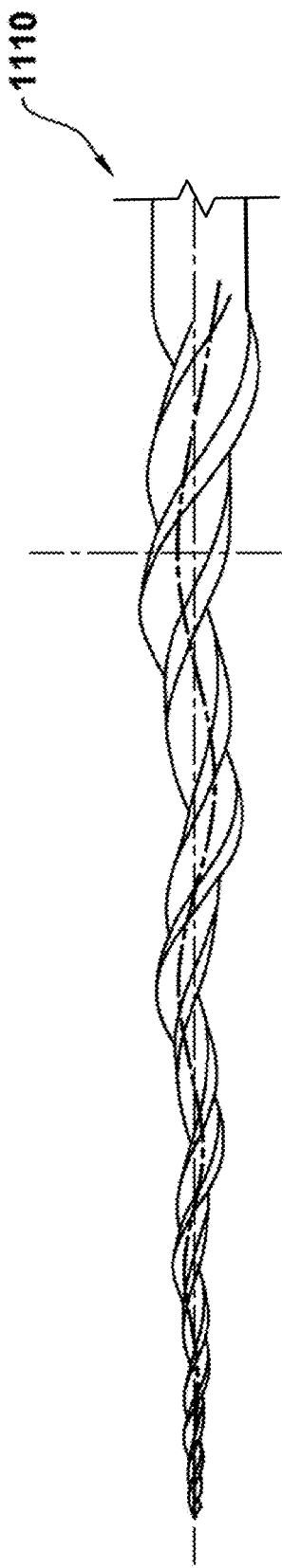
FIG. 11A depicts another example endodontic instrument.
Figure 11B:
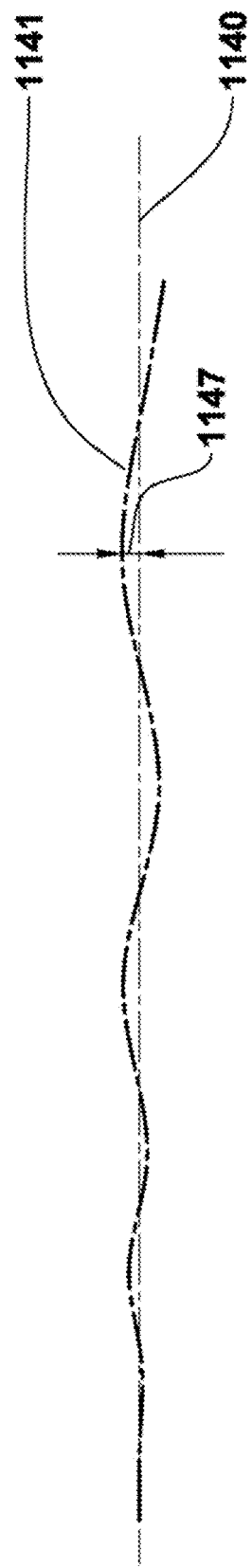
FIG. 11B illustrates the axis of rotation and the center of mass path of the endodontic instrument of FIG. 11A.

Again, and as depicted by the example endodontic instrument 1110 in FIGS. 11A and 11B, the design and fabrication method 2 (i.e., grinding the instrument such that the centers of mass of the cross-sections are offset from the axis of rotation), results in the cutting axis (also referred to herein as the "center of mass path") being offset from, and spiraling around, the axis of rotation of the endodontic instrument while the instrument is in a natural condition (i.e., free from external stresses).

In this example, the center of mass path 1141 spirals around the axis of rotation 1140. When viewed in 3-dimensisons, Axis 2 also becomes a precessional axis. The amount of off-set between the center/axis of rotation and the center of mass of the instrument's cross-sections is defined by the distance 1147 between these two axes 1140 and 1141, and varies along the entire length of the endodontic instrument 1110. In this particular example, the distance 1147 is maximum at the shank end (where the working body joins the shank) and gradually reduces along the working body (to zero at the tip, i.e., the tip is completely centered on the axis of rotation).

In further consideration of the endodontic instrument constructed according to method 2, the precessional axis also produces a transverse mechanical wave defined by a series of peaks and troughs. The amplitude or heights of the peaks are at a maximum when the endodontic instrument is in its free and unconstrained position. When the endodontic instrument is inserted into the root canal, the peaks may be compressed. The amount of compression will depend upon the diameter and the curvature of the canal (ECS). Theoretically, when the endodontic instrument is fully compressed, the center of mass path 1141 will flatten out and be collinear with the axis of rotation 1140. As each peak along the endodontic instrument is elastically compressed, it behaves like a small spring and is a source of potential or stored energy.

Analysis of Endodontic Instruments as a Variable Rate Spring

Another factor that must be considered in understanding the function and advantages of the endodontic instrument made in accordance with method 2, is studying the endodontic instrument's stiffness and/or flexibility. As clearly seen in the perspective views of FIGS. 10A and 10B, such endodontic instruments possess the unique configuration of a coil or spring which differentiates it from traditional endodontic instruments.

Stiffness and/or flexibility can be quantified using a parameter known as a spring constant ("k"), which is defined as the amount of force that is required to cause a unit of deformation. In its general form, $k=F/\delta$, where k equals the stiffness, F equals force and $\delta$ equals displacement. Equations for the determination of the spring constant of actual mechanical systems are widely available in engineering literature. Due to the constantly changing cross section of an endodontic instrument of the designs described herein, the spring constant of the endodontic instruments will vary along their lengths. This spring constant, together with the endodontic instrument precession, directly affects the cutting forces applied to the surrounding root dentine during cutting.

In the first part of this analysis, the spring condition along the entire length of the endodontic instrument will be considered. In the offset tip endodontic instrument design (e.g., as shown in FIG. 7), the tip of the endodontic instrument is in its unconstrained condition and sits at some distance from the central axis. The offset shank design (e.g., FIGS. 8, 9, and 11) reverses the direction of the offset angle. The following discussion is applicable to both the offset tip and the offset shank designs.

Figure 12A:
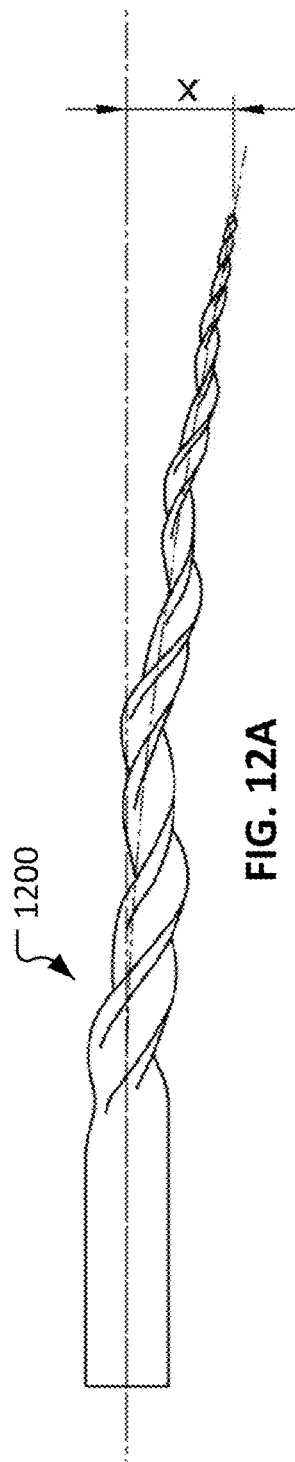
FIG. 12A depicts an example endodontic instrument with a tip that is offset from the axis of rotation.
Figure 12B:
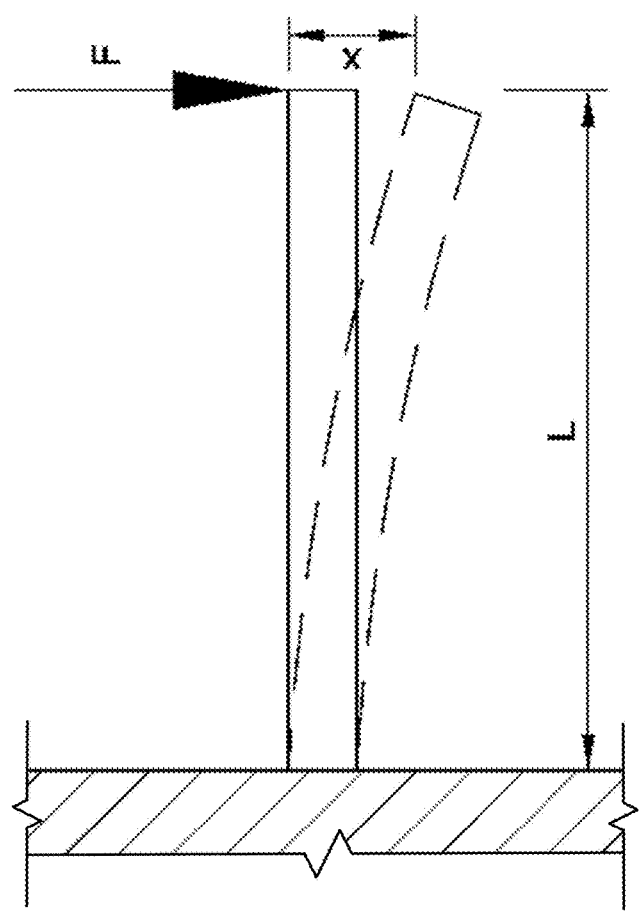
FIG. 12B depicts a cantilevered beam that is deflected by a force.

FIG. 12A depicts an endodontic instrument 1200 with offset tip, which can be analyzed in general terms using the equations for a cantilevered beam as depicted in FIG. 12B.

In FIG. 12A, an example endodontic instrument 1200 with offset tip design in its unconstrained condition is shown. If this endodontic instrument 1200 is inserted into a relatively straight endodontic cavity with a diameter that is narrower than the diameter of the endodontic instrument's cutting envelop, the endodontic instrument 1200 will be constrained along its length such that its axis of rotation and the central axis become more closely aligned. The resulting condition can be analyzed in general terms using the equations for a cantilever beam as depicted in FIG. 12B. As the endodontic instrument 1200 is rotated, the constrained or compressed endodontic instrument will expand and the coil-like structure will try to return to its unconstrained position. The ability of the endodontic instrument to return to the unconstrained position will be dependent upon its stiffness k, but also on the distance x (FIG. 12B) as seen in the equation $F=kx$. Thus, the greater the distance of the off-set cross-section from the central axis the greater the "stored energy" which can translate into passive cutting during rotation. As previously mentioned, this feature would not only serve to accommodate the endodontic instrument 1200 as it passes into and through a narrow or tortuous portion of the root canal, but would also serve to mitigate the opportunity for cyclic fatigue.

Figure 13A:
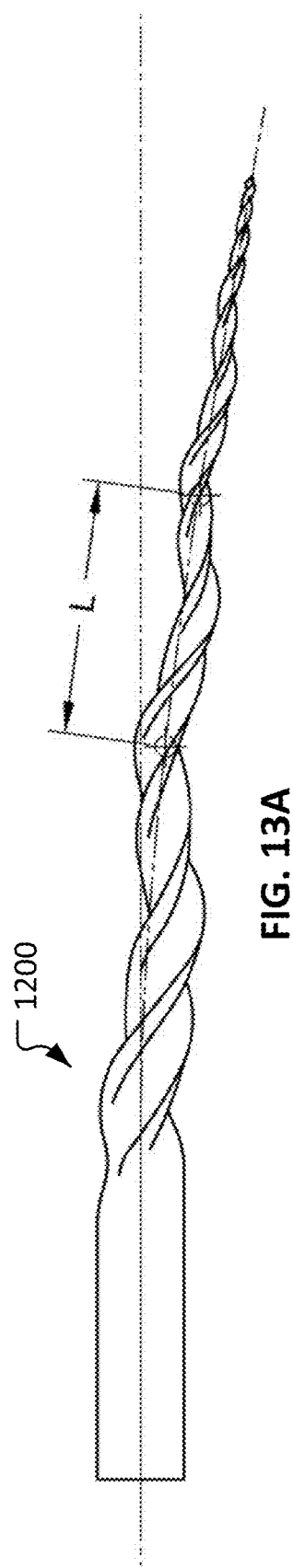
FIG. 13A depicts an example endodontic instrument with a tip that is offset from the axis of rotation.
Figure 13B:
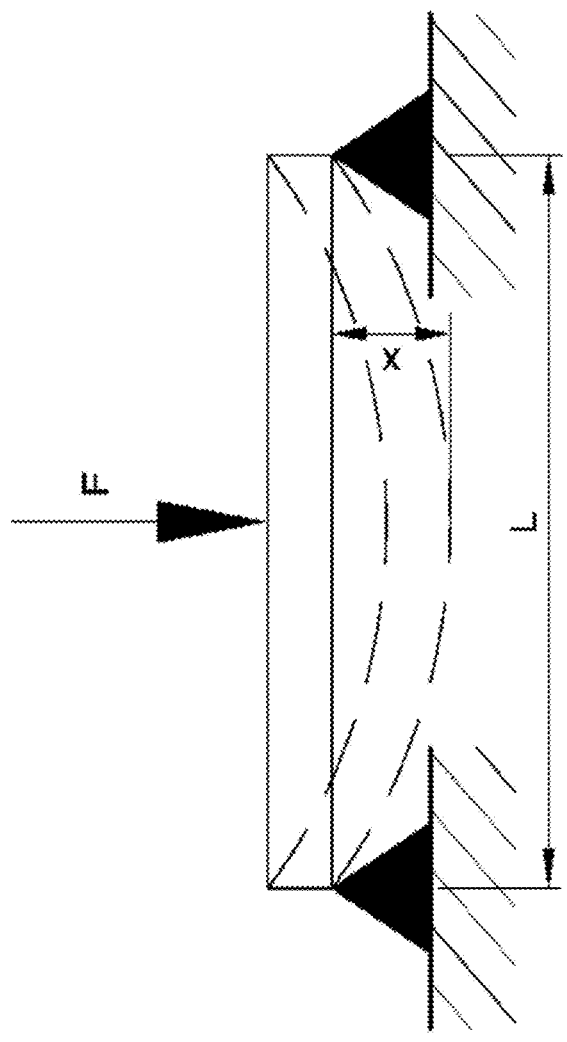
FIG. 13B depicts a simply supported beam that is deflected by a force.

FIGS. 13A and 13B can be used to analyze a localized section L of the endodontic instrument 1200 as it bends to conform to the ECS during use. L is distance between the crest of two nodes, with which the spring rate of a single wave between the crests can be analyzed. FIG. 13B is a schematic of a simply supported beam where x is the maximum deflection, If the localized section L of the endodontic instrument is analyzed using the terminology defined in the waveform discussion above, the spring rate k of a single wave crest between two nodes can be analyzed. In this case, the localized performance of the endodontic instrument can be analyzed using the equations for a simply supported beam in FL3/48EI=48EI/L3. L represents the distance between any two nodes, "I" represents the moment of inertia which is dependent upon the cross sectional area of the endodontic instrument and will vary along its length, and "E" represents the modulus of elasticity (Young's Modulus), which is used to define the stiffness of different materials.

When the initial conditions of this endodontic instrument 1200 as it is inserted into an ECS and undergoing radial constraining forces are evaluated, the reverse occurs of what is depicted in FIGS. 12A and 13A, that is, the instrument shown is those figures is in its unconstrained or uncompressed condition. Here F represents the force exerted on the endodontic instrument by the canal wall. Since the endodontic instrument is built with multiple nodes (crests and troughs) and potential deflections, the tendency of F will be to straighten out the endodontic instrument along its length. When the endodontic instrument is fully constrained, x, which represents the deflection of the endodontic instrument due to F would be zero (or nearly zero) and the cross-section of the endodontic instrument will be completely centered.

Figure 14B:
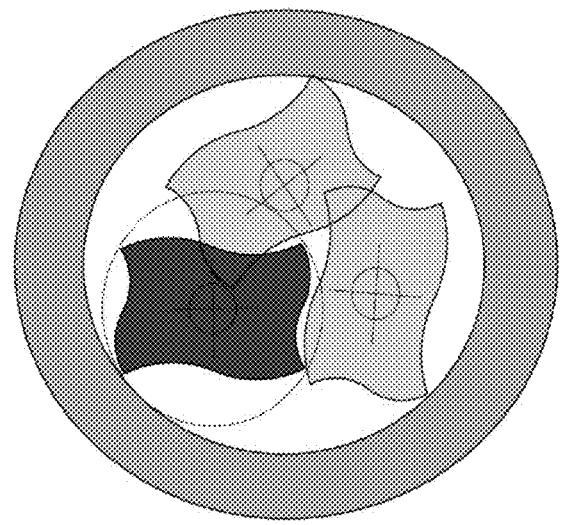
FIG. 14B illustrates the tendency of the endodontic instrument of FIG. 14A to seek its natural configuration when diametrical constraints are reduced.
Figure 14A:
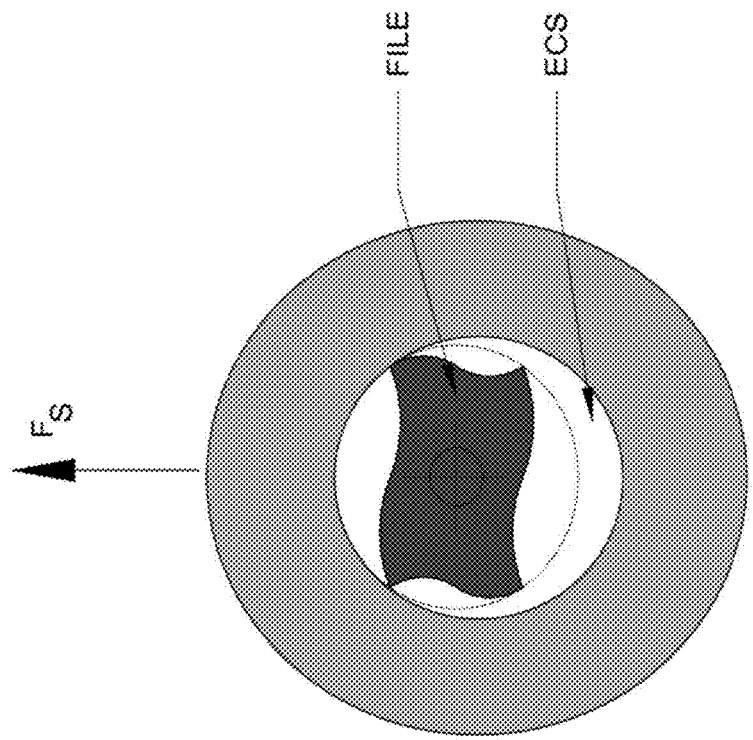
FIG. 14A illustrates a cross-section of an example endodontic instrument in a constrained condition within an endodontic cavity space.
Figure 15B:
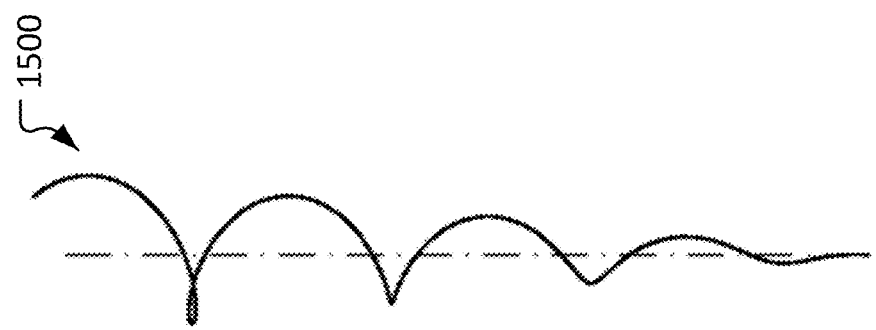
FIGS. 15A-15F are schematic illustrations of an endodontic instrument as it transitions from an unconstrained condition to a completely constrained condition.
Figure 15A:
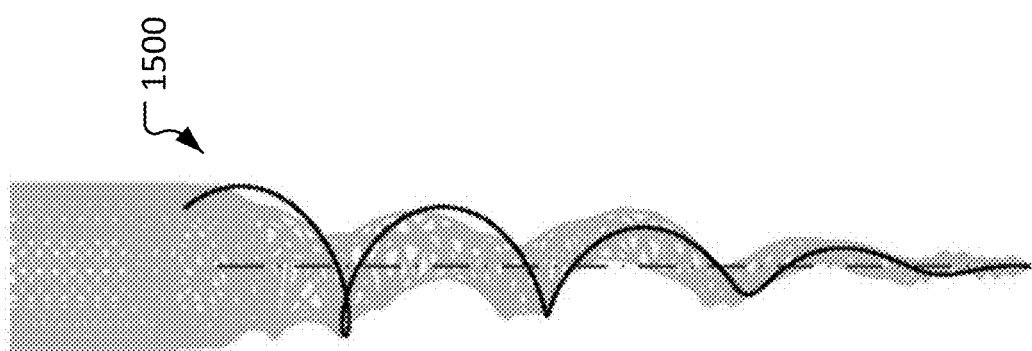
Figure 15D:
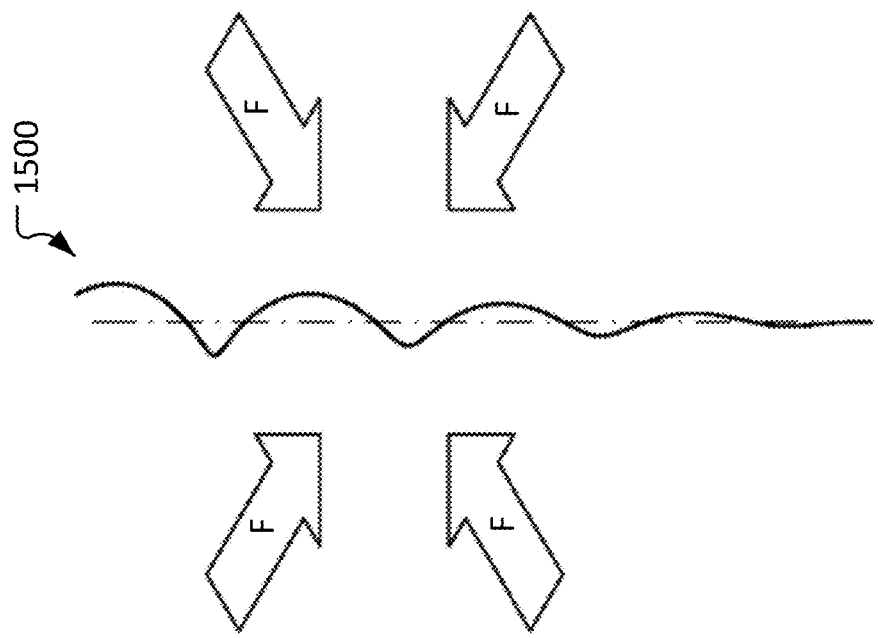
Figure 15C:
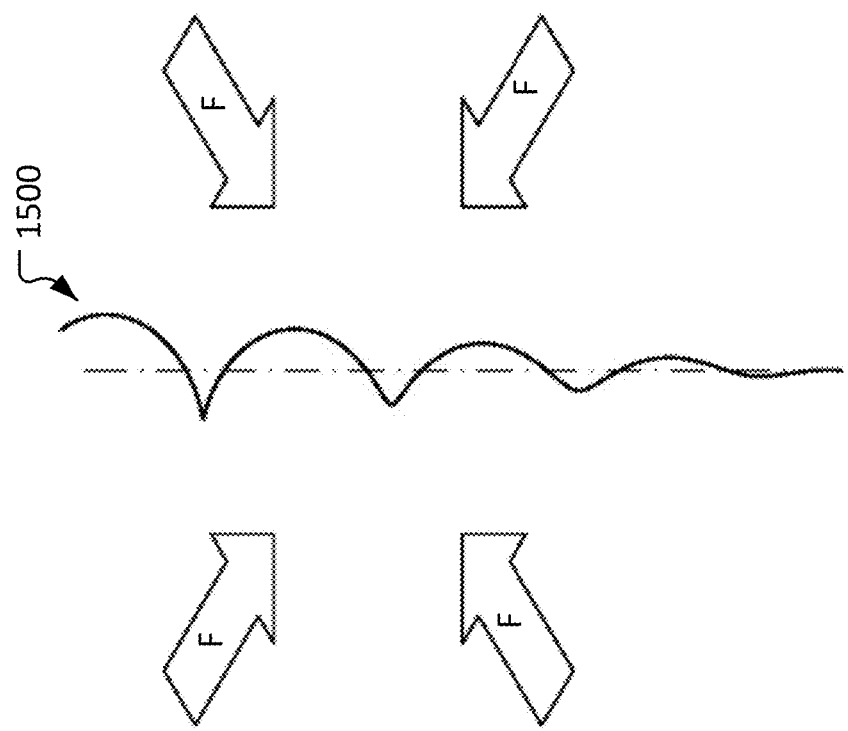
Figure 15F:
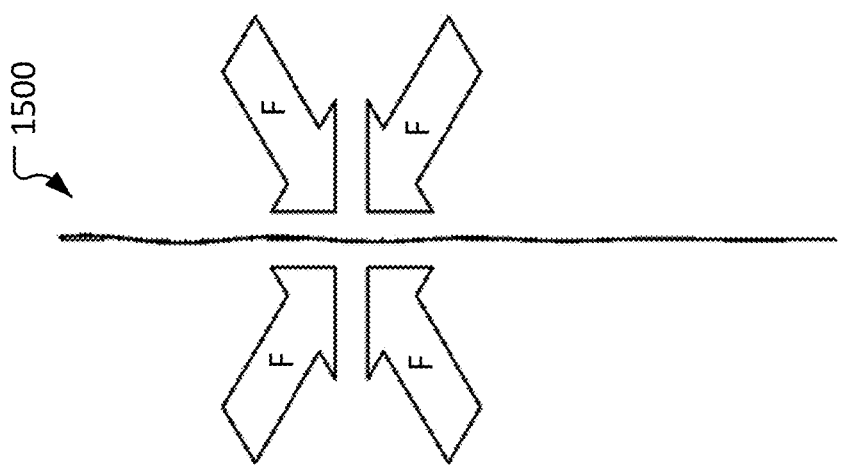
Figure 15E:
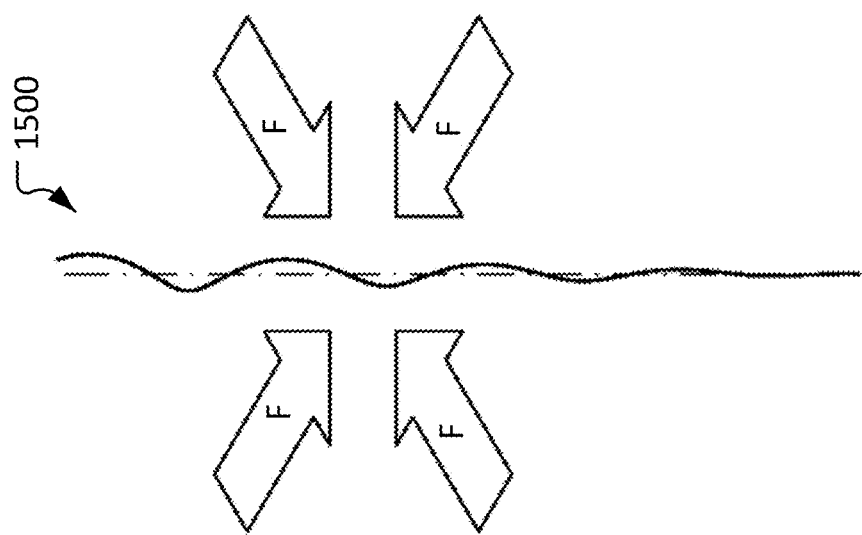

FIG. 14A depicts the cross-section of the instrument when in its constrained or compressed condition. When the endodontic instrument is fully constrained, x, which represents the deflection of the endodontic instrument due to F, would be zero or nearly zero.

FIG. 14B demonstrates the endodontic instrument's inherent tendency to return to its natural or less-compressed state in which it is precessing about its central axis.

An overview and schematic of an example spiral instrument 1500 in its entirety, as it transitions from its initial unconstrained condition to a completely constrained condition is shown in FIGS. 15A through 15F. In its completely unconstrained state (FIGS. 15A and B), the instrument 1500 presents as a spiral, corkscrew, spring (e.g., a conical spring shape or a tornado spring shape), or coil-like structure, which is radially compressible as described herein.

Lateral or radial forces F, depicted by the arrows F in FIGS. 15C-15F are generated as the endodontic instrument is inserted into the ECS, which is in this example radially narrower than the natural outer profile of the instrument 1500. When the endodontic instrument 1500 is completely radially constrained and x (the distance between the cross-sectional centers of mass and the axis of rotation) is zero, the endodontic instrument becomes straight or nearly straight as show in FIG. 15F. As the endodontic instrument 1500 rotates, one or more (or all) of the cutting edges under the load of the spring force, will begin to remove material from the surrounding cavity. This process will continue until the endodontic instrument 1500 has enlarged the ECS based the endodontic instrument 1500 diameter and the precessional axis. In this final unconstrained condition, the spring force or cutting force will be nearly zero and the endodontic instrument 1500 will be rotating freely in the ECS about the central axis (the axis of rotation).

A design of this nature, would theoretically allow the instrument 1500 to engage the walls of the ECS intermittently as the constrained coil rotates in the canal and allowed to unwind releasing "stored energy." As already eluded to, the release of stored energy is dissipated gradually, which would minimize binding, mitigate cyclic fatigue, and provide the opportunity to clean both inner and outer curvature of the canal wall more thoroughly.

This phenomenon of diametric/radial compressibility can also facilitate the negotiation of more complicated anatomy, i.e., enable better maneuverability in narrowing or constricted and tortuous ECS architecture. In addition, endodontic instruments such as these are more compliant and will demonstrate better centering and less apical transportation, which will better preserve the original anatomy of the ECS.

Mass Moment of Inertia

When studying the performance of an endodontic instrument body, reamer, or a drill during cutting, one consideration is the moment of inertia of the cross-section, which is a measure of its resistance to distortion and torsional failure.

When the cross-sections of various endodontic instruments are examined, it can be discovered that a rectangular cross-section, has innate advantages over a triangular cross-section. Also, the reason why orientation of the cutting blades (edges) in the long axis of the cross-section is advantageous can be discovered.

Comparing the formulas for moment of inertia for both a triangle ($I_{triangle}=bh^3/36$) and a rectangle ($I_{rectangle}=bh^3/12$), it can be seen that the inertia for a rectangle is at least ⅓ greater than that of a triangle with similar base and height.

Another consideration is the resistance of the cross-section to flexural failure or torsional failure. In planar physics, and as just mentioned, the moment of inertia is the capacity of a cross-section of a mass to resist distortion. It is considered with respect to a reference axis and how that cross-sectional area is distributed about the reference axis, usually a centroidal axis. The moment of inertia (also described as the second moment of the area) is expressed in its simplest mathematically terms as:

$$I_x = \Sigma(A)(y^2)$$

"A" is the area of the plane of the cross-section and "y" is the distance between the centroid of the object and the central or x-axis. In further considering an endodontic instrument, and in particular an endodontic instrument with rectilinear cross-section, it can be readily seen the displacement of the centroid of the cross-section plays a much more important role than the area of cross-section itself in resisting distortion. As seen from the formula above, improvements in the torsional inertia of a planar object increases, not only by the area the object, but by the square of the distance between the turning (central axis) and the centroid (center of mass).

On further analysis, it can be seen that improvement of the mass moment of inertia, which is related to the planar moment of inertia, can also improve resistance to distortion. This is best described by the parallel-axis theorem and in the context of FIG. 16A, where a lamina or cross-section of an offset cylindrical drill body with a rectilinear cross-section is seen.

Figure 16A:
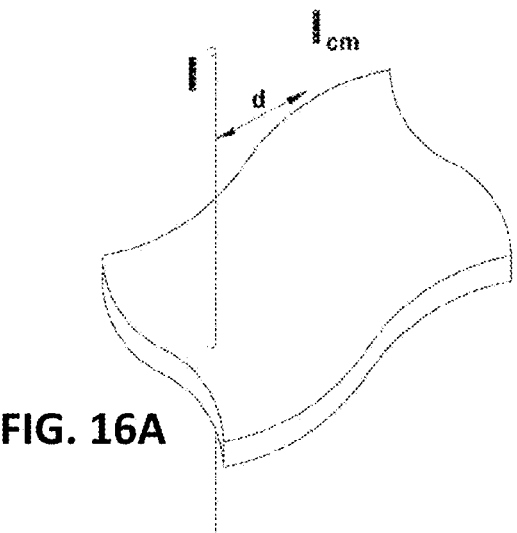
FIG. 16A is a free body diagram demonstrating the components of a lamina of an example endodontic instrument with an offset center of mass.

FIG. 16A is a schematic demonstrating the components of a lamina of an endodontic instrument with an offset center of mass and the components under consideration in applying the parallel axis theorem.

Referring to FIG. 16A, one can write the formula for the parallel-axis theorem as:

$I = I_{cm} + md^2$

Here "$I_{cm}$" is the moment of inertia of a body of mass "m" with respect to a line through its centroid "cm." "I" is the total moment of inertia with respect to a line parallel to the central axis or axis of rotation, and "d" is the distance between the two lines. Thus, for a given lamina, total inertia I (and the resistance to distortion) can be improved by improvements in both the mass of a cross-section and an exponential increase in the distance from the central axis to the centroid.

A practical example of the parallel-axis theorem is a hammer rotating about an axis perpendicular to the handle. The farther the axis of rotation extends away from the head of the hammer, and toward the end of the handle, the greater the total inertia at the end of the hammer after it is released, rotates and strikes an opposing surface.

In the case of an endodontic instrument with a rectangular cross-section, it is helpful to understand that the moment of inertia (or the resistance to distortion) is continually varying as the instrument rotates. The cross sectional view of this endodontic instrument can be simplified such that it can be looked at as a two-dimensional rectangle or any quadrangle (see FIG. 16B).

Two different values for the moment of inertia can be calculated using the equation:

$I_x = bh^3/12$

In one instance, b will be along the long axis of the rectangle (and the cutting axis) and in the second instance b will be represented by the shorter axis, the bending axis. The moment of inertia when b is along the shorter axis will be much less, which dictates this as the bending axis.

As an endodontic instrument with a rectangular cross-section rotates and enters a curved ECS, it will be continuously alternating between its two moments of inertia (between stiff and flexible positions). Due to lower stress on the endodontic instrument that is associated with the thinner cross section (smaller moment), the endodontic instrument will naturally tend to bend around this axis as it rounds the curve of a canal, but continually oriented such that the cutting blades remain in the long axis for maximum strength or resistance to distortion.

Thus, the geometry of the cross-section of this endodontic instrument has been optimized to provide the best endodontic instrument performance. The endodontic instrument is wider and stiffer through one direction of the cross section (providing the strength and rigidity during cutting) and a thinner and more flexible across the other direction of the cross section (for flexibility). The continued rotation of the endodontic instrument allows both of these characteristics to be manifest simultaneously and, of course, influences the endodontic instrument's performance.

Figure 16B:
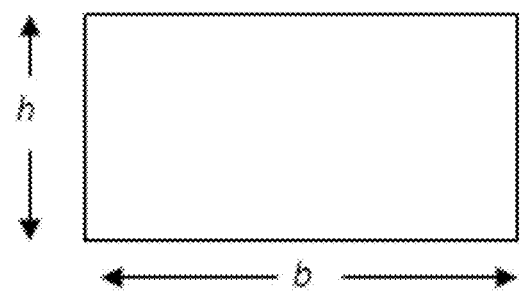
FIGS. 16B and 16C illustrate a cross-sectional view of an example endodontic instrument that has a rectilinear shape.
Figure 16C:
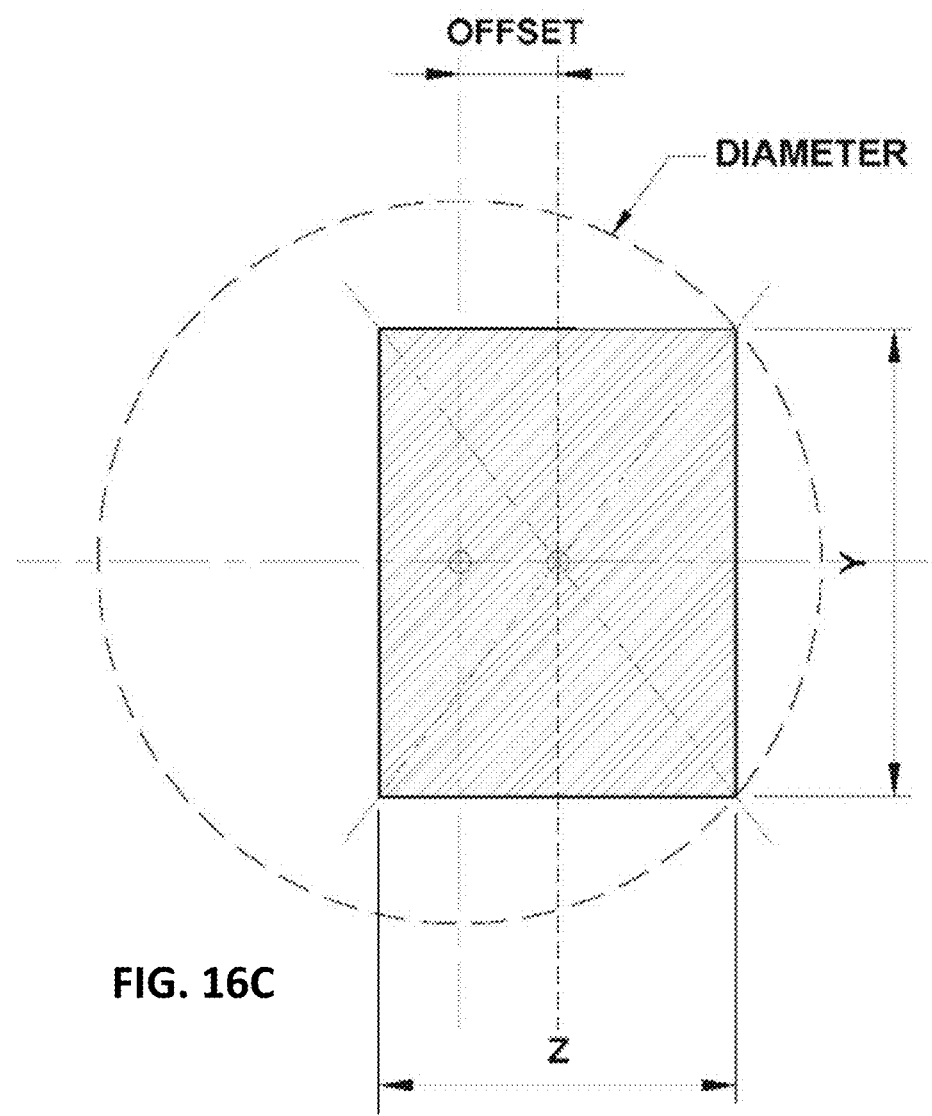

FIG. 16C is a schematic of an offset rectilinear (in cross-sectional shape) endodontic instrument demonstrating the adjustability of the distance of the offset from central axis. The offset rectilinear cross-section as seen in FIG. 16C demonstrates how the mass of the endodontic instrument can be adjusted across any lamina, improving flexibility and resistance to cyclic fatigue. As can be seen from the diagram, the endodontic instrument can be made more or less resistant to distortion or more or less flexible by increasing or decreasing the distance of the offset from the central axis. Obviously, there is an optimum offset distance and orientation of the cross-section, which offers both resistance to torsional failure and maximum flexibility. This distance, however, is dependent on the configuration of the cross-section of the endodontic instrument itself, the number of nodes of the endodontic instrument, the distance between each node (also called pitch), the diameter of the instrument at any point along its working surface, which is dictated by the tips size and taper (and whether the taper in uniform or variable), the material the endodontic instrument is made from and numerous other variables. It the experience of the inventor, however, that optimization occurs when the centroid is displaced 20% or more from the axis of rotation. Instruments that are ground with this specification have been demonstrated to be compressible between one and two instruments sizes or 0.05 to 0.10 mms when compared to traditional instruments (instruments which a similar rotation axis and centroid) without offset, where the compressibility of traditional instruments is negligible.

FIGS. 17A-17V illustrate an implementation of an example endodontic instrument 1700 described herein. In FIGS. 17A-17G, the endodontic instrument 1700 is shown in its natural shape (e.g., unaffected by external forces from the wall of the ECS). In FIGS. 17H-17N, the endodontic instrument 1700 is shown in a radially constrained state (e.g., as a result of radially compressive forces from the wall of an ECS).

The endodontic instrument 1700 includes four sides and edges, is rectilinear in transverse cross-section, and can be utilized to remove tissue and/or dentin from an ECS. The instrument 1700 includes a shank 1710 and a working portion 1712, which is tapered in a shank to tip direction. The tip 1713 includes an active or cutting surface, which is confluent with the working surface 1712. Alternatively, the leading tip 1713 can include a non-active or non-cutting surface, which is also confluent with the working surface 1712. The maximum flute diameter (MxFD) 1717 is located near the shank end 1711 of the cutting surface and the minimum flutes diameter (MnFD) 1716 is located near the tip 1713. The shank 1710 above the working portion 1712 is essentially cylindrical and exhibits a slightly larger diameter than the working surface 1712. A fitting, which is suitable for an engine driven motor of a hand-piece and chuck, or a handle utilized for manual instrumentation, can be attached to the shank 1710.

While the endodontic instrument 1700 is in its natural, unconstrained state, the center of mass path 1741 of the endodontic instrument 1700 spirals around the axis of rotation 1740. The offset is maximum where the working surface 1712 meets the shank 1710. From the position where the working surface 1712 meets the shank 1710, proceeding toward the tip 1713, the offset decreases. The offset at the tip 1713 is zero (i.e., the center of mass at the tip 1713 is on the axis of rotation). Hence, the endodontic instrument 1700 in an unconstrained state will have a conical outer profile when rotated about its axis of rotation 1740.

Figure 17O:
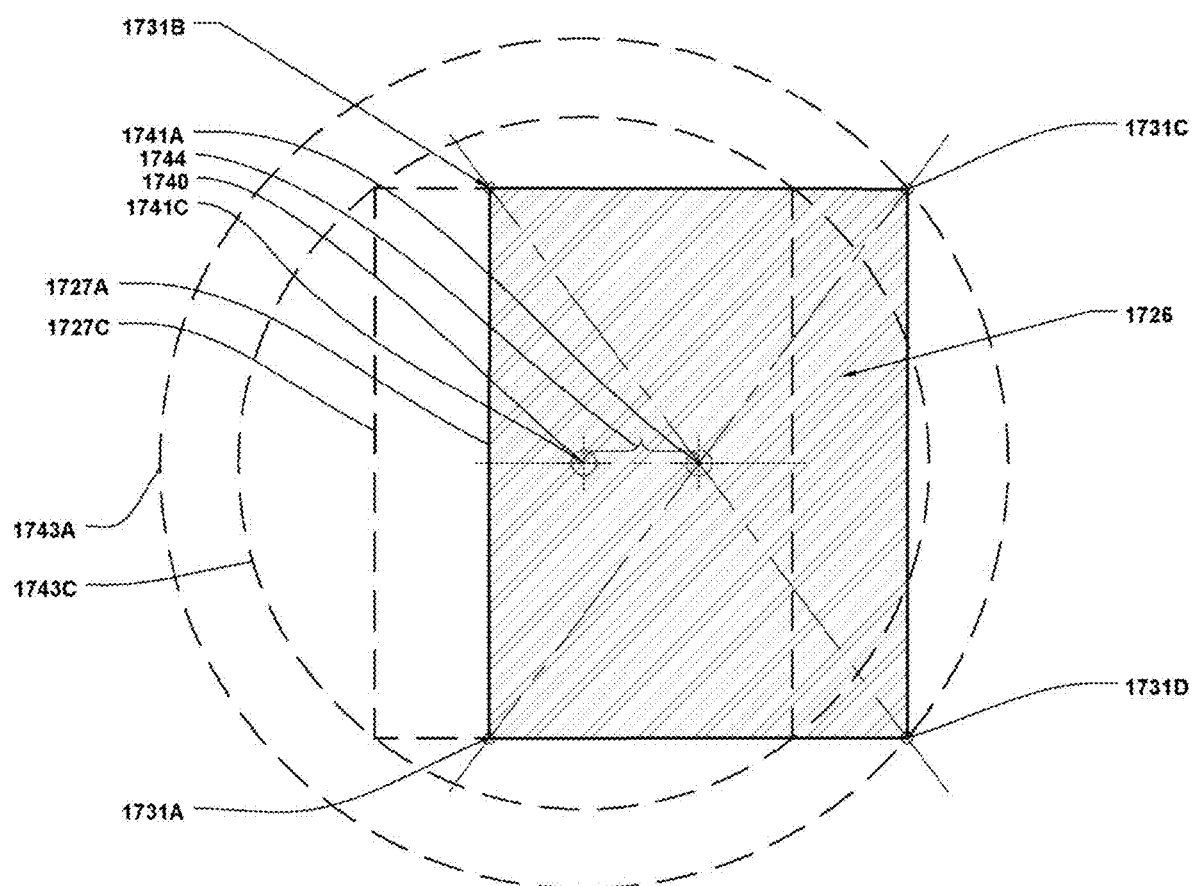
FIG. 17O depicts a cross-section of the instrument of FIGS. 17A and 17B.
Figures 1, 17O:
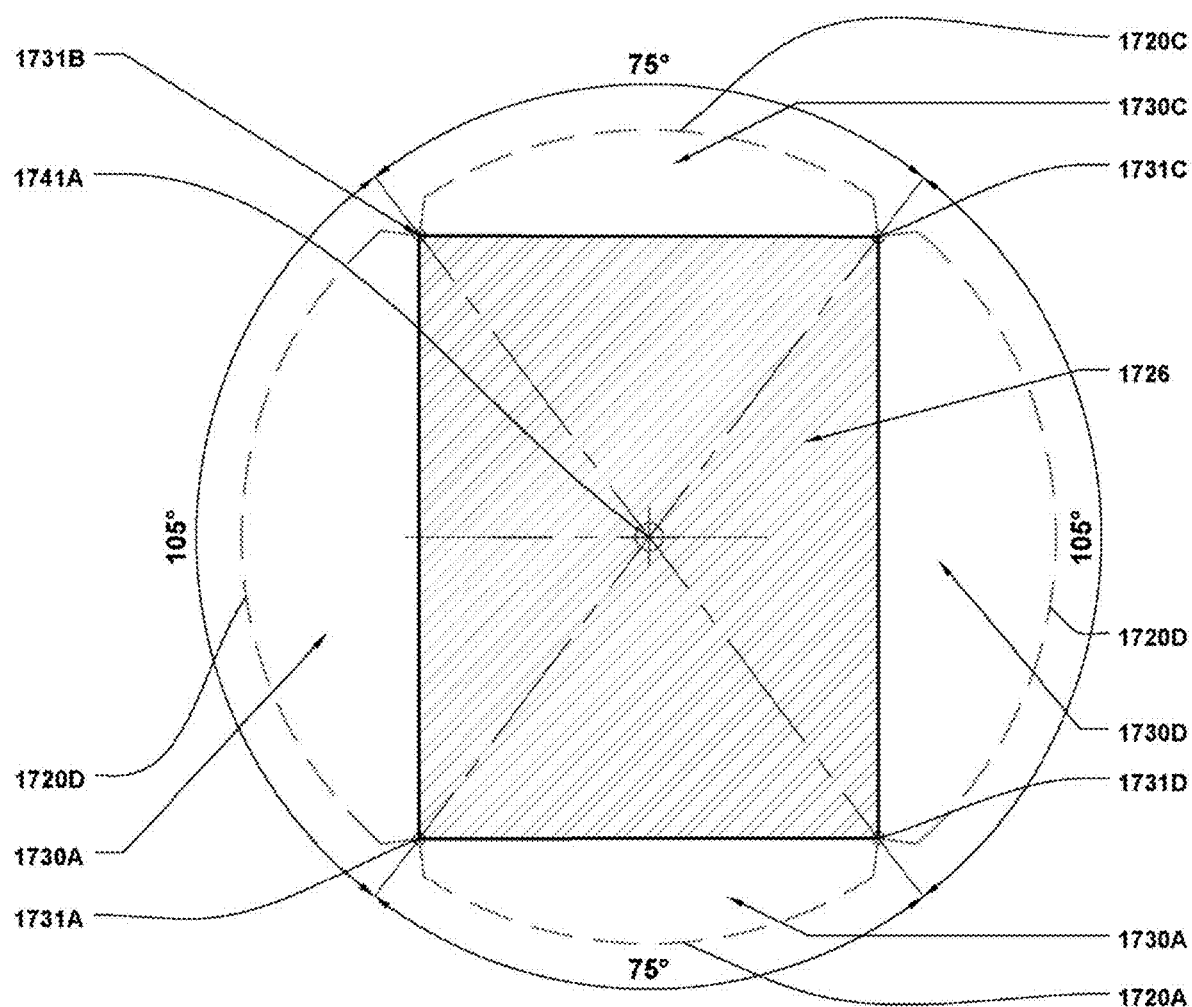
FIG. 1 depicts an example transverse wave pattern.

As shown in FIGS. 17A-C, there are four continuous helical flutes 1720A, 1720B, 1720C and 1720D, which are flats or grooves that follow the circumference of the working surface 1712, and spiral around the central axis 1740 toward the leading tip 1713. These flutes 1720A, 1720B, 1720C and 1720D may be equidistant from each other or become increasingly tighter or more numerous as they approach the tip 1713. Flutes 1720A, 1720B, 1720C and 1720D revolve around the central axis 1740 in either a right to left, or left to right direction. The total number of revolutions of each flute 1720A, 1720B, 1720C and 1720D between the MxFD 1717 to the MnFD 1716 are not less than one and not greater than ten. Helical flutes 1720A, 1720B, 1720C and 1720D each originate at the MxFD 1717 at separate locations. Flutes 1720A and 1720C are substantially wider than flutes 1720B and 1720D. All flutes conform to the shape of a bi-symmetric rectilinear cross-section as shown in FIGS. 17D-17G, 17K-N, 17O and 17O-1 and 17S-V. Each flute 1720A, 1720B, 1720C and 1720D is continuous along the length of the cutting surface 1712 to the leading tip 1713.

With reference to FIGS. 17D-G, 17O and 17O-1, it can be seen that flutes 1720A, 1720B, 1720C, and 1720D have straight splines located between the edge tips 1731A, 1731B, 1731C, and 1731D. These splines may also be configured to be concave, convex, S-shaped or variety of other shapes useful in cutting and carrying or hauling debris away from the working surface and leading tip. As shown in FIG. 17D-G, the flutes 1720A, 1720B, 1720C, and 1720D cooperate to form a web or core 1726, which is rectilinear (i.e., rectangular in this example, but may alternatively be another four-sided shape such as a trapezoid or parallelogram). The web or core is outlined by areas of clearance designated by numerals 1730A, 1730B, 1730C, and 1730D (see FIG. 17O-1). The clearance areas 1730A, 1730B, 1730C, and 1730D can be of variable proportion and depth. Clearance areas 1730A, 1730B, 1730C, and 1730D are circumscribed by the perimeter of the cutting envelope 1743A (or 1743C).

As shown by FIGS. 17A-G, it can be seen that flutes 1720A, 1720B, 1720C, and 1720D intersect the periphery of the outer-most cutting envelope 1743A via cutting edge tips 1731A, 1731B, 1731C, and 1731D (depending on the offset). In this implementation, and as shown in FIG. 17O-1, these intersections are at 75 degrees, 105 degrees, 75 degrees, and 105 degrees of separation, forming various rake angles with the cutting envelope 1743A. In this instance, lines drawn connecting points 1731A, 1731B, 1731C, and 1731D form a bi-symmetrical rectangle. The difference in degrees between the widest flutes 1720A and 1720C and the narrowest flutes 1720B and 1720D is 30 degrees. Alternatively cutting tips cutting edge tips 1731A, 1731B, 1731C, and 1731D can intersect the cutting envelope 1734A at differing angles by increasing or decreasing the distance between the widest and narrowest flutes, for example, 100 degrees verses 80 degrees etc. Thus, the outline of the rectilinear cross-section between cutting tips 1731A, 1731B, 1731C, and 1731D can vary. The difference in the number of degrees of separation between the widest flutes and narrowest flute should not be less than 5 degrees and not greater than 70 degrees.

The depth and height of each flutes can vary, however, the cross-sectional diameter of the core portion 1726 should, in general, not be narrower than half or fifty percent of the cross sectional diameter of the instrument.

FIGS. 17H-17N are a repetition of FIGS. 17A-G, but when the instrument 1700 is fully radially constrained, e.g., confined by the ECS prior to cutting. With further reference to FIGS. 17O and 17P-V, the transition between an instrument that is a fully constrained and unconstrained can be visualized. As the instrument 1700 rotates and transitions from fully constrained to unconstrained, the center of mass path 1741 of the endodontic instrument 1700 shifts from being aligned with the axis of rotation 1740 to being a spiral around the axis of rotation 1740 (as depicted in FIGS. 17A-17G). The transition can be seen occurring in any cross-sectional view both horizontally and vertically, whereby the centroid corresponds to the axis of rotation when fully constrained and corresponds to the mass path 1741 (FIG. 17P) when unconstrained.

Referring further to FIG. 17O, the transition of the cross-sectional center of mass between a fully constrained endodontic instrument 1727C and unconstrained endodontic instrument 1727A is exemplified by distance 1744. When the instrument is unconstrained, distance 1744 generally decreases from shank to tip. During the transition the distance 1744 is variable and corresponds to the degree of constraint or relaxation of the endodontic instrument 1700 as it rotates. As the endodontic instrument 1700 is transitioning between a fully constrained endodontic instrument 1727C and unconstrained endodontic instrument 1727A, it should also be recognizable that the clearance areas 1730A-D are continuously changing such that the cutting perimeter transitions (i.e., enlarges) from cutting perimeter 1743C (when fully constrained) to cutting perimeter 1743A (when unconstrained).

In this specific implementation, the center of mass 1741 and the axis of rotation 1740 at the tip 1713 are coincident during both constrained (FIG. 17N) and unconstrained states (FIG. 17G). Other implementations are envisioned, which including a tip that maintains a constant distance away from the central axis or a variable distance.

Also in this specific implementation (as best seen in FIG. 17O), all cutting edge tips 1731A, 1731B, 1731C, and 1731D are in contact with the cutting periphery 1743C when the instrument 1700 is fully constrained. However, when the instrument 1700 is unconstrained only some cutting edge tips (e.g., cutting edge tips 1731C and 1731D in this example) are in contact with the cutting periphery 1743A. In this scenario, cutting edge tips 1731A and 1731B are not performing any cutting. Those skilled in the art will recognize numerous other implementations, for example an implementation with only one cutting edge. It should also be recognized that a myriad of rectilinear cross-sectional areas are possible, for example a trapezoid, a rhomboidal and/or a hybridization of any and all of these nuances, for example a rhomboidal cross-section with alternating cutting tips. Numerous other cross-sections are also possible, which may include a two-side or three-sided endodontic instrument. A fuller description of these cross-sections and cutting patterns follows.

Other Implementations

As described above, it can be readily shown that a quadrilateral cross-section with an offset center of mass has greater torsional inertia and the potential for better resistance to cyclic fatigue and breakage than an offset triangular cross-section. That said, other quadrilateral implementations are also envisioned within the scope of this disclosure. These implementations may be particularly advantageous, if changes are also made in the modality of operation, for example, reciprocation verse rotation, speed and/or applied torque of rotation, and variations in the choice of materials for fabrication. Of particular interest are bi-symmetrical and asymmetrical trapezoidal cross-sections due to improvements in torsional inertia, which will be described further.

Figure 18A:
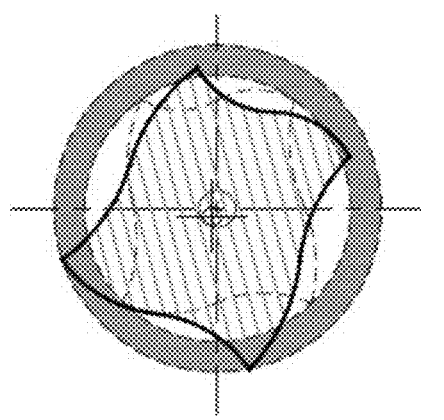
FIGS. 18A-18D depict an endodontic instrument having an isosceles trapezoid cross-sectional shape in transverse cross-section in both its unconstrained and constrained configurations.
Figure 18B:
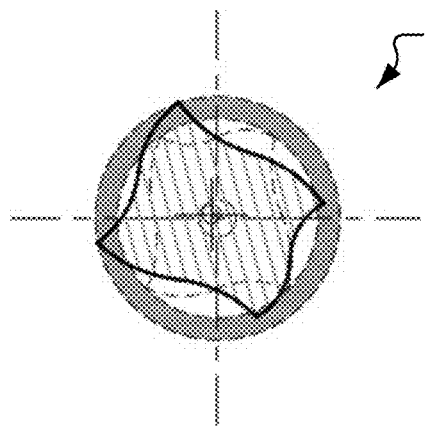
Figure 18D:
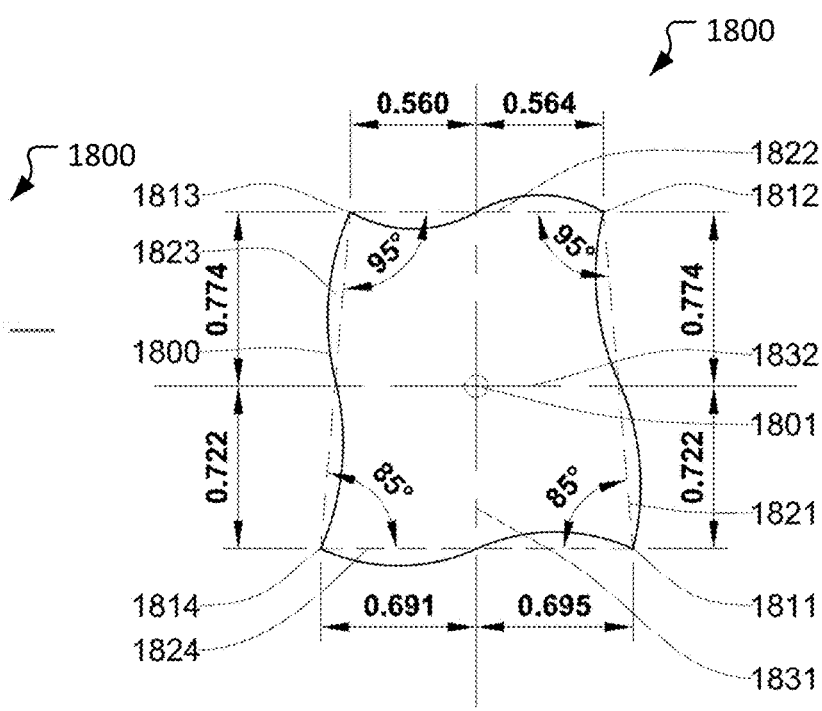
Figure 18C:
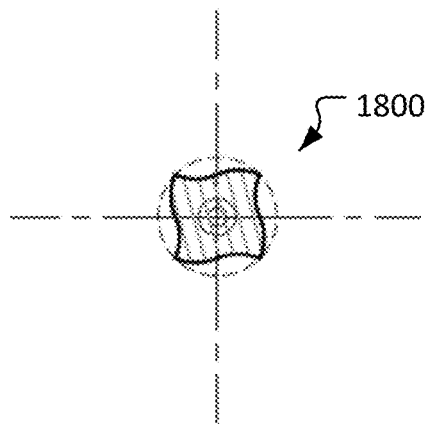

FIGS. 18A through 18C illustrate an example trapezoidal cross-sectional shape implementation of an endodontic instrument 1800 described herein in its alternately unconstrained condition and in its radially constrained condition. FIG. 18D illustrates a detailed cross-sectional view of the endodontic instrument 1800. Such a trapezoidal cross-sectional shape has an offset center of mass (as a result of the trapezoidal shape) and the instrument 1800 overall (like other example instruments described above) has natural a spiral or corkscrew shape thereby leading to the center of mass of the cross-sections being offset from the axis of rotation for a second reason.

In FIGS. 18A through 18C, the radially constrained condition is shown in dotted lines whereas the unconstrained condition is shown in solid lines and can be seen to expand into the shaded area (which represents an enlarged ECS diameter). Like the previous figures, it can be seen in FIGS. 18A through 18C that the cross-section becomes continuously smaller/narrower from shank to tip, whereby the tip of the instrument (shown in FIG. 18C) is completely centered on the axis of rotation and transitions into a symmetrical square cross-section.

Referring to the detailed cross-section shown in FIG. 18D, the endodontic instrument 1800 includes four corners/edges or cutting angles 1811, 1812, 1813, and 1814 and four sides. The sides of the depicted embodiment are S-shaped, but in some embodiments the sides are linear. Lines 1821, 1822, 1823, and 1824 are straight, linear lines that are drawn as extending between each pair of corners of the four corners 1811, 1812, 1813, and 1814. The lines 1811, 1812, 1813, and 1814 can be used to help describe the shape of the depicted cross-section.

The depicted cross-sectional shape of the endodontic instrument 1800 is configured to represent a bi-symmetrical trapezoid (or an isosceles trapezoid) with a line of symmetry 1831 that bisects the trapezoid. The center of mass 1801 is closer to the long base (represented by line 1824) than to the short base (represented by line 1822).

The endodontic instrument 1800 can be utilized to remove tissue and/or dentin from an endodontic cavity space (ECS) or root canal space. The cutting angles (the angles between the adjacent lines 1821, 1822, 1823, and 1824) are separated by 85° and 95° respectively, which can be modified, but must be less than or greater than 90°. The four sides cooperate to form a web or core portion with a center of mass 1801, which is separate and offset from the axis of rotation. In this configuration, orientation of the cutting flutes pits the long base of the trapezoid (represented by the line 1824) against the walls of the ECS. Accordingly, corners 1811 and 1814 are the primary cutting edges. However, in the radially constrained configuration (as depicted in the dashed line shape of FIGS. 18A and 18B) all four corners 1811, 1812, 1813, and 1814 may be in contact with the wall of the ECS.

The sides of the trapezoid, also called splines, may be configured to be straight (linear), or S-shaped (as shown) or a variety of other shapes useful in cutting and carrying or hauling debris away from the working surface and leading tip. The depth and height of each flute can vary, however, the cross-sectional diameter of the core portion should, in general, not be narrower than half or fifty percent of the cross-sectional diameter of the instrument 1800.

Although certain features of the trapezoidal cross-section mimic the rectangular cross-section in FIG. 17, if we refer to FIGS. 16A-16C and the formula and discussion for the parallel-axis theorem:

$$I = I_{cm} + md^2$$

we see that the total inertia, I, is dependent on the distance, d, between lines drawn between the center or rotation and the center of mass. Thus, a trapezoid configuration improves the distance between the center of rotation and the center of mass in at least one dimension exponentially and, in turn, improves total rotational inertia or resistance to breakage.

Figure 19A:
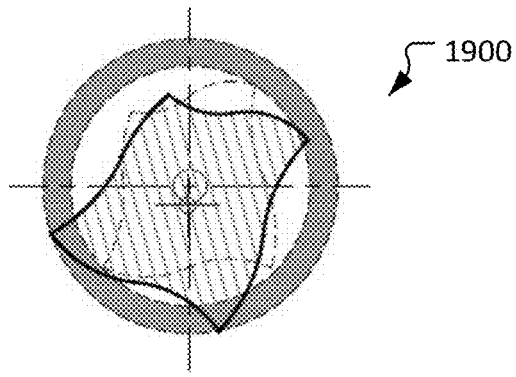
FIGS. 19A-19D depict an endodontic instrument having a trapezium (a quadrilateral with no parallel sides) or a general irregular quadrilateral cross-sectional shape in transverse cross-section in both its unconstrained and constrained configurations with the edges of the base of the trapezium (represented by line 1924) pitted against the wall of the ECS in both its unconstrained and constrained configurations.
Figure 19B:
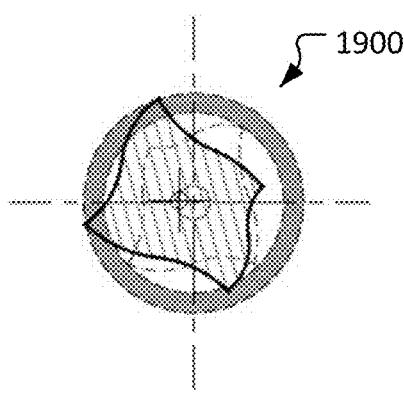
Figure 19C:
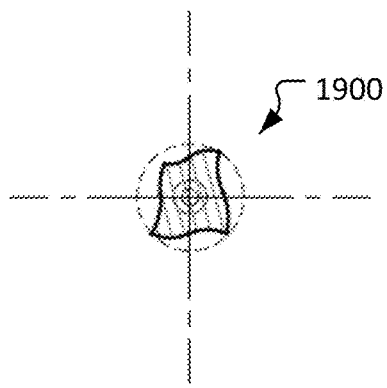

FIGS. 19A-19K illustrates an implementation of an endodontic instrument 1900 described herein in its alternately unconstrained and constrained condition. Referring specifically to FIGS. 19A-19C the cross-section of the endodontic instrument 1900 in its radially constrained condition is shown is dashed lines, whereas the unconstrained condition is shown in solids lines (and can be seen to expand into the shaded area representing the ECS after some enlargement by the endodontic instrument 1900).

Referring to the detailed schematic 19D, the endodontic instrument 1900 includes four corners/edges or cutting angles 1911, 1912, 1913, and 1914 and four sides. The sides of the depicted embodiment are S-shaped, but in some embodiments the sides are linear or have another shape.

The dashed lines 1921, 1922, 1923, and 1924 are straight, linear lines that are drawn as extending between each pair of corners of the four corners 1911, 1912, 1913, and 1914. The lines 1921, 1922, 1923, and 1924 can be used to help describe the completely asymmetrical shape of the depicted cross-section.

The four corners/edges 1911, 1912, 1913, and 1914 are positioned relative to each other such that lines 1921, 1922, 1923, and 1924 that drawn between each pair of adjacent corners of the four corners 1911, 1912, 1913, and 1914 results in four lines 1921, 1922, 1923, and 1924 that have no parallelism nor perpendicularity relative to each other. That is, no two lines of the four lines 1921, 1922, 1923, and 1924 are parallel to each other, and no two lines of the four lines 1921, 1922, 1923, and 1924 are perpendicular to each other.

The line 1922 can corresponding to a first side of the cross-sectional shape of the endodontic instrument 1900. The line 1923 can correspond to a second side of the cross-sectional shape of the endodontic instrument 1900. The line 1924 can correspond to a third side of the cross-sectional shape of the endodontic instrument 1900. The line 1921 can correspond to a fourth side of the cross-sectional shape of the endodontic instrument 1900. In the depicted embodiment, the second side is longer than the first side; the third side is longer than the second side; and the fourth side is longer than the third side.

The endodontic instrument 1900 is configured with a cross-sectional shape that is known as a trapezium (a quadrilateral with no parallel sides) or a general irregular quadrilateral. The endodontic instrument 1900 can be utilized to remove tissue and/or dentin from an endodontic cavity space (ECS) or root canal space. The cutting angles between joining lines of the four lines 1921, 1922, 1923, and 1924 are separated by dissimilar degrees. In this instance the sides and resultant cutting angles are separated by 80°, 85°, 83° and 112° respectively, which can be modified, but must all be less than or greater than 90°. The four sides cooperate to form a web or core portion with a center of mass 1901, which is separate and offset from the axis of rotation (due to the asymmetrical cross-section).

In this configuration of the endodontic instrument 1900, the orientation of the cutting flutes pits the side the trapezoid represented by line 19s4 against the walls of the ECS (endodontic cavity space) or root canal space. That is, the two corners 1911 and 1914 are the primary cutting points/edges of the endodontic instrument 1900 (whereas the other corners/edges 1912 and 1913 are out of contact with the wall of the ECS). However, when the endodontic instrument 1900 is fully radially constrained within the ECS, then the three corners 1911, 1912, and 1914 are the cutting points/edges of the endodontic instrument 1900 (whereas the other corner 1913 is out of contact with the wall of the ECS).

The two primary cutting points/edges of the endodontic instrument 1900 (the two corners 1911 and 1914) are the pair of adjacent corners between which the third side (represented by line 1924) extends. The three cutting points/edges (the three corners 1911, 1912, and 1914) of the endodontic instrument 1900 that are in contact with the wall of the ECS when the endodontic instrument 1900 is in the fully radially constrained configuration are the corners between which the third side (represented by line 1924) extends and between which the fourth side (represented by line 1921) extends.

The sides of the endodontic instrument 1900, also called splines, may be configured to be straight (linear), or S-shaped (as shown), or variety of other shapes useful in cutting and carrying or hauling debris away from the working surface and leading tip. The depth and height of each flute can vary, however, the cross-sectional diameter of the core portion should, in general, not be narrower than half or fifty percent of the cross-sectional diameter of the instrument 1900.

Although certain features of the trapezoidal cross-section mimic the rectangular cross-section in FIG. 17, if we refer to FIGS. 16A-16C and the formula and discussion for the parallel-axis theorem:

$$I = I_{cm} + md^2$$

we see that the total inertia, I, is dependent on the distance, d, between lines drawn between the center or rotation and the center of mass. Thus, a trapezoid configuration improves the distance between the center of rotation and the center of mass in both dimensions exponentially and, in turn, improves the total inertia of resistance to breakage.

Figure 19D:
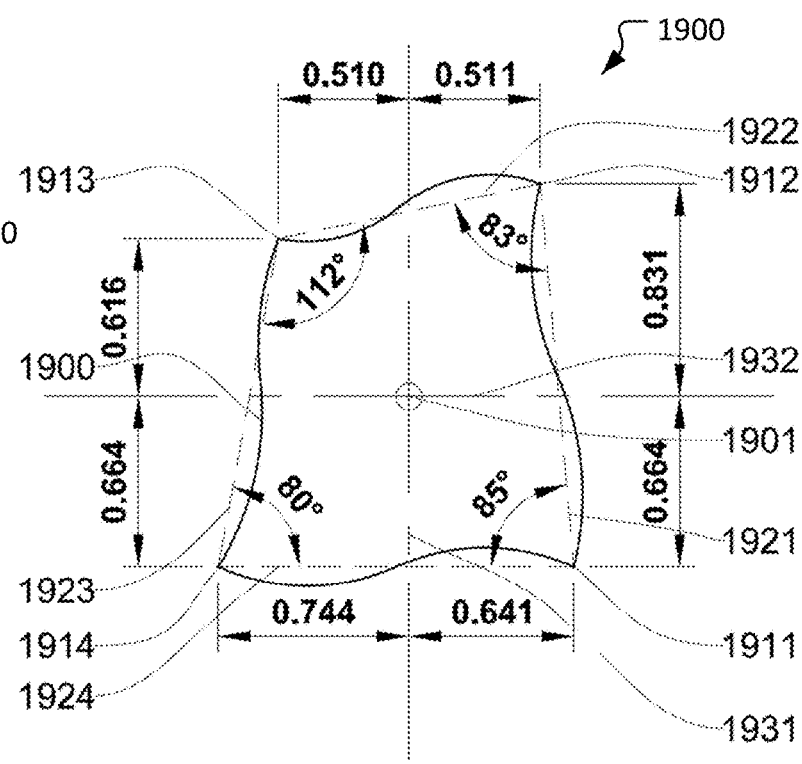
Figures 19E, 19F, 19G:
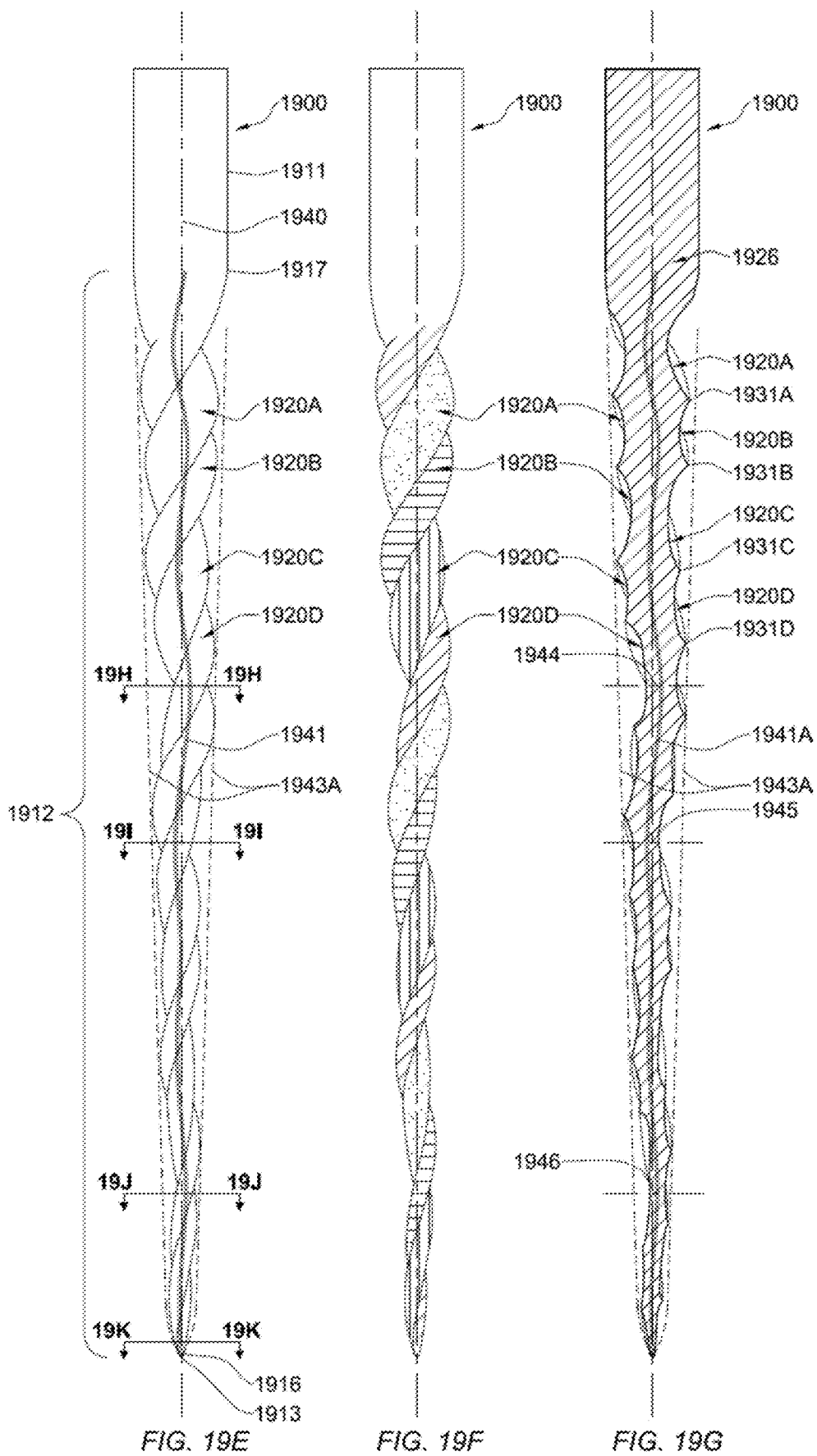
FIG. 19E is a longitudinal view of the instrument shown in 19A-19D in its unconstrained condition.
FIG. 19F is a longitudinal view of the instrument shown in 19A-19E demonstrating the resultant flute pattern as the sides 1921-1924 revolve around the long axis of the instrument.
FIG. 19G is a longitudinal cross-sectional view of the instrument shown in 19A-19F showing alternating cutting edges and freeway spaces envisioned by the design.
Figure 19H:
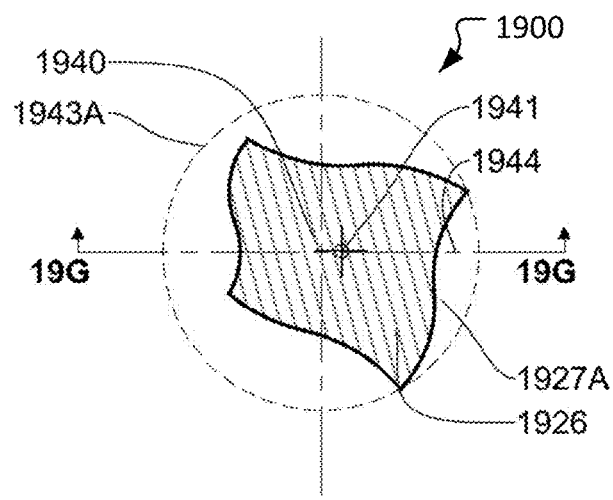
FIGS. 19H-19K are the transverse cross-sectional views as indicated in FIG. 19E.
Figure 19J:
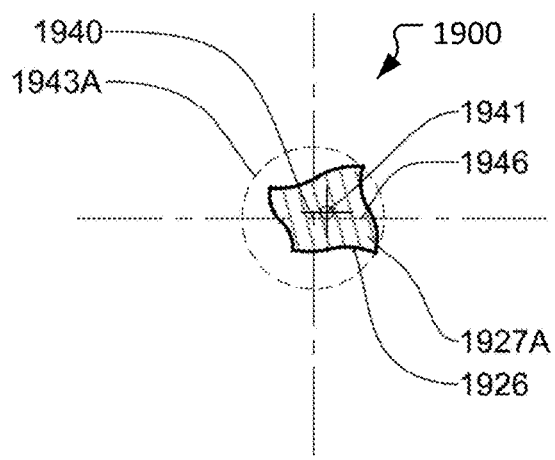
Figure 19I:
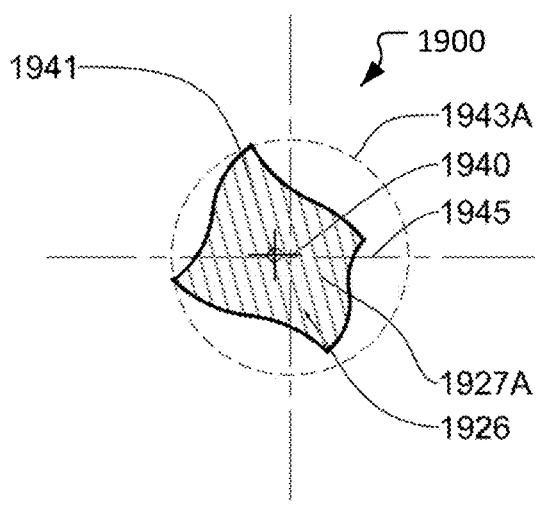
Figure 19K:
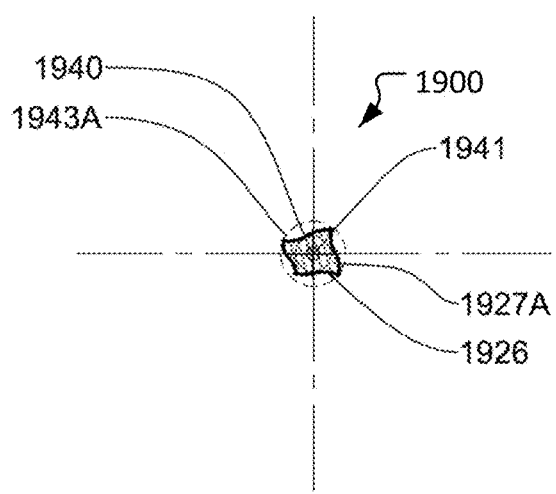

Referring to FIG. 19E, the endodontic instrument 1900 is shown in its natural or unconstrained condition. The instrument 1900 includes a shank 1911 and a working portion 1912, which is tapered in a shank to tip direction. The tip 1913 includes an active or cutting surface, which is confluent with the working surface 1912. Alternatively, the leading tip 1913 can include a non-active or non-cutting surface, which is also confluent with the working surface 1912. The maximum flute diameter (MxFD) 1917 is located near the shank end of the cutting surface and the minimum flutes diameter (MnFD) 1916 is located near the tip. The shank is essentially cylindrical and exhibits a slightly larger diameter than the working surface. A fitting, which is suitable for an engine driven motor of a hand piece and chuck, or a handle utilized for manual instrumentation, can be attached to the shank.

While the endodontic instrument 1900 is in its natural or unconstrained state, the center of mass path 1941 of the endodontic instrument 1900 spirals around the axis of rotation 1940. Hence, the centers of mass of the cross-sections are offset from the axis of rotation for two reasons: (i) because the cross-sectional shape is a trapezium (a quadrilateral with no parallel sides) or a general irregular quadrilateral and (ii) because the profile of the endodontic instrument 1900 is spiral or corkscrew shaped. The offset is maximum where the working surface 1912 meets the shank 1910. From the position where the working surface 1912 meets the shank 1910, proceeding toward the tip 1917 the offset decreases. The offset at the tip 1913 is zero, i.e., the center of mass at the tip 1913 is on and coincides with the axis of rotation. Hence, the endodontic instrument 1900 in an unconstrained state will trace out a conical shape when rotated about its axis of rotation 1940.

As further shown in FIG. 19E, there are four continuous helical flutes 1920A, 1920B, 1920C and 1920D, which present as grooves that follow the circumference of the working surface 1912, and spiral around the central axis 1940 toward the leading tip 1913. These four flutes 1920A, 1920B, 1920C and 1920D may maintain the same spacing per unit length, also known as pitch, or become increasingly tighter or more numerous as they approach the tip. Flutes 1920A, 1920B, 1920C and 1920D revolve around the central axis 1940 in either a right to left or left to right direction. The total number of revolutions of each flute 1920A, 1920B, 1920C and 1920D between the MxFD 1919 to the MnFD 1916 are not less than one and not greater than ten. Helical flutes 1920A, 1920B, 1920C and 1920D each originate at the MxFD 1919 at separate locations. Flutes 1920A and 1920C are substantially wider than flutes 1920B and 1920D and all flutes conform to the shape of an asymmetrical trapezoid cross-section as shown in FIGS. 19A-D. Each flute 1920A, 1920B, 1920C and 1920D is continuous along the length of the cutting surface 1912 to the leading tip 1913.

As shown in FIGS. 19E-K, flutes 1920A, 1920B, 1920C, and 1920D cooperate to form a web or core 1926, which is a trapezium (a quadrilateral with no parallel sides) or a general irregular quadrilateral. The web or core is outlined by areas of clearance designated by numerals 1930A, 1930B, 1930C, and 1930D. As previously mentioned, the clearance areas 1930A, 1930B, 1930C, and 1930D created by the cooperation of the splines can be of variable proportion and depth. Clearance areas 1930A, 1930B, 1930C, and 1930D are circumscribed by the perimeter of the cutting envelope 1943A.

As further shown by FIGS. 19E-G, flutes 1920A, 1920B, 1920C and 1920D intersect the periphery of the outer-most cutting envelope 1943A via cutting edges 1931A, 1931B, 1931C, and 1931D. In this implementation, and as shown in FIG. 19D, these intersections are at 80 degrees, 112 degrees, 83 degrees, and 85 degrees of separation, forming various rake angles with the cutting envelope 1943A. In this instance, lines drawn connecting the cutting angles 1931A, 1931B, 1931C, and 1931D form a trapezium (a quadrilateral with no parallel sides) or a general irregular quadrilateral. The difference in degrees between the widest flutes 1920A and 1920C and the narrowest flutes 1920B and 1920D is always less than 32 degrees. Alternatively, cutting edge tips 1931A, 1931B, 1931C, and 1931D can intersect the cutting envelope 1934A at differing angles by increasing or decreasing the distance between the widest and narrowest flutes. Thus, the outline of the asymmetric trapezoidal cross-section between cutting tips can vary. Although the depth and height of each flute can vary the cross-sectional diameter of the core portion 1926 should not be narrower than half or fifty percent of the cross-sectional diameter of the instrument 1900.

As the instrument 1900 rotates and transitions from fully constrained to unconstrained, the center of mass path 1941 of the endodontic instrument 1900 shifts from being nearly aligned with the axis of rotation 1940 (except for the offset from the cross-sectional shape) to spiraling around the axis of rotation 1940 to a greater extent (as a result of both the cross-sectional shape and the spiral or corkscrew profile). The transition can be seen occurring in any cross-sectional view both horizontally and vertically.

Those skilled in the art will recognize numerous other implementations, for example an implementation with only one cutting edge. It should also be recognized that a myriad of asymmetric trapezoidal (trapezium or general irregular quadrilateral cross-sections) are possible.

Figure 20A:
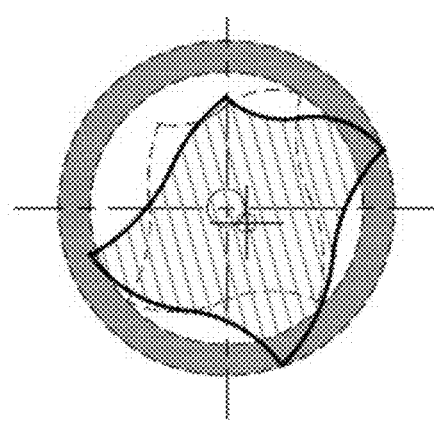
FIGS. 20A-20C is another example endodontic instrument with the same cross-sectional shape as FIGS. 19A-19K, but with the edges of the longest side of the trapezium (represented by line 1921) pitted against the wall of the ECS in both its unconstrained and constrained configurations.
Figure 20B:
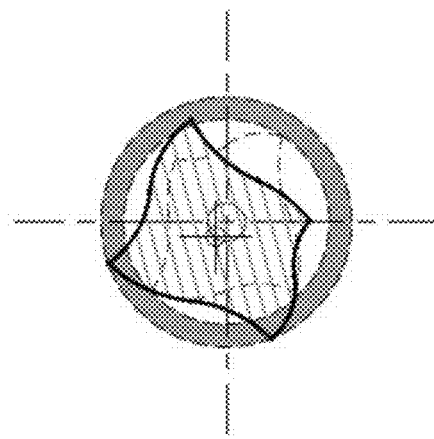
Figure 20C:
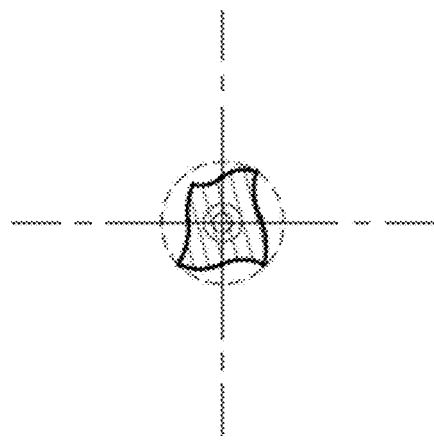

FIGS. 20A through 20C illustrates an implementation of an endodontic instrument with a cross-sectional shape (having asymmetric trapezoidal, trapezium, or general irregular quadrilateral cross-sectional shapes), that is similar to 19A-K but is configured and fabricated such that the longest side (the fourth side) of the asymmetrical trapezoidal cross-section is in contact with the wall of the ECS.

Although, as described above, it can be readily shown that a quadrilateral cross-section with an offset center of mass has greater torsional inertia and the potential for better resistance to cyclic fatigue than an offset triangular cross-section, other implementations are envisioned. These implementations may be particularly advantageous, if changes in metallurgy, modality of operation (reciprocation verse rotation) or other changes are employed and are as follows.

FIGS. 21A-28C illustrate three cross-sectional views of each type of endodontic instrument of multiple types of endodontic instruments (i.e., having various cross-sectional shapes such as triangular, rectangular, parallelogram, etc.). Three figures ("A," "B," and "C") are provided for each type of endodontic instrument.

Each of the FIGS. 21A-28C shows the arrangement of the instrument's cross-section in relation to the ECS wall in two ways. That is: (i) the cross-section shown in solid lines corresponds to when the instrument is not fully radially constrained, and (ii) the cross-section shown in dashed lines corresponds to when the instrument is fully radially constrained. The concentric dashed line circles bounding the gray ring shown in FIGS. 21A-28C represent two different diameters of the ECS wall. In particular, the inner dashed circle represents the ECS wall when the ECS is small in relation to the natural state of the endodontic instrument, such that the ECS fully radially constrains (compresses) the endodontic instrument. The outer dashed circle represents the ECS wall when the ECS is larger in diameter, such that the ECS does not fully radially constrain or compress the endodontic instrument.

The first cross-sectional view of each type of endodontic instrument (FIGS. 21A, 22A, 23A, 24A, 25A, 26A, 27A, and 28A) is a cross-section taken where the working body of the endodontic instrument conjoins with the shank. It can be seen that the center of mass of the cross-sections where the working body of the endodontic instrument conjoins with the shank is offset from the axis of rotation when the endodontic instrument is not fully radially constrained, and that the center of mass of the cross-sections where the working body of the endodontic instrument conjoins with the shank are coincident with the axis of rotation when the endodontic instrument is fully radially constrained. The other cross-sectional views of each type of endodontic instrument (FIGS. 21B, 21C, 22B, 22C, 23B, 23C, 24B, 24C, 25B, 25C, 26B, 26C, 27B, 27C, 28B, and 28C) are cross-sections taken along the working body of the respective endodontic instruments. In some embodiments, the tip of the endodontic instrument(s) has a center of mass that is coincident with the instrument's axis of rotation (both when the instrument is fully radially constrained and when the instrument is not fully radially constrained). In some embodiments, the tip of the endodontic instrument(s) has a center of mass that is offset from the instrument's axis of rotation when the instrument is not fully radially constrained, and that is coincident with the instrument's axis of rotation when the instrument is fully radially constrained.

Figure 21A:
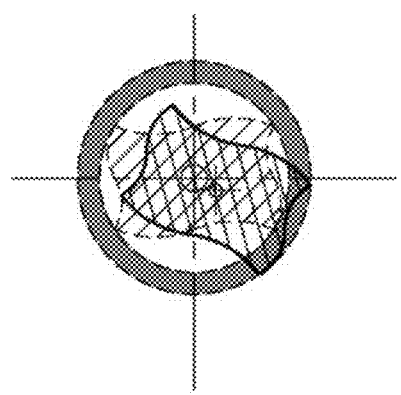
FIGS. 21A-21C depict cross-sectional views of another example endodontic instrument taken at various locations along the body of the instrument and in two conditions of diametrical constraint.
Figure 21B:
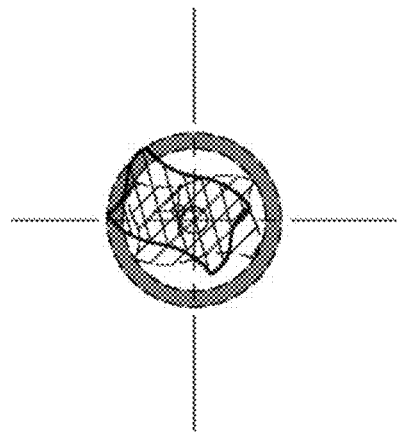
Figure 21C:
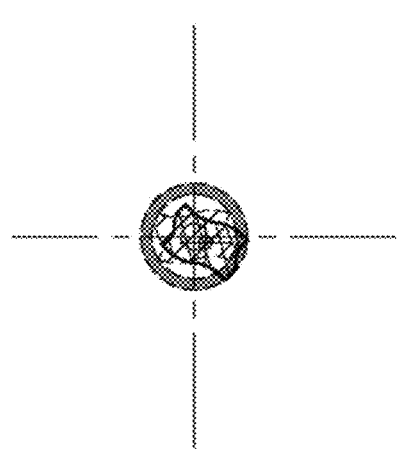

FIGS. 21A-21C illustrate an S-splined offset rectangular cross-section with two cutting edges that are on the same side, but are positioned along the narrowest flutes of the cross-section. This configuration would offer improved cutting ability, but would necessarily be less resistant the torsional failure.

Figure 22A:
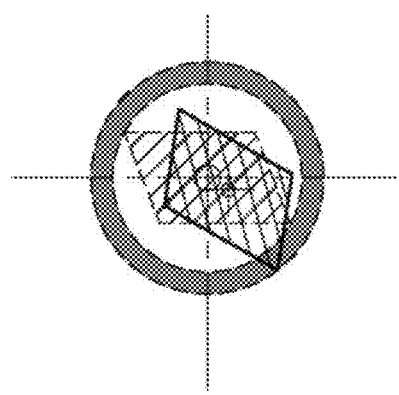
FIGS. 22A-22C depict cross-sectional views of another example endodontic instrument taken at various locations along the body of the instrument and in two conditions of diametrical constraint.
Figure 22B:
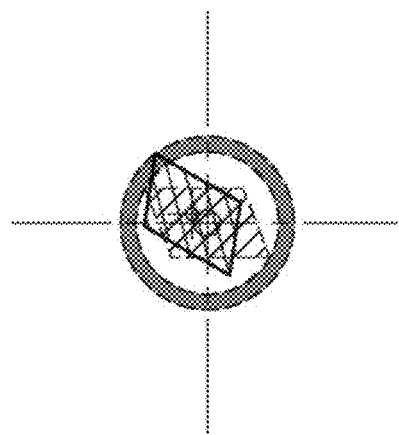
Figure 22C:
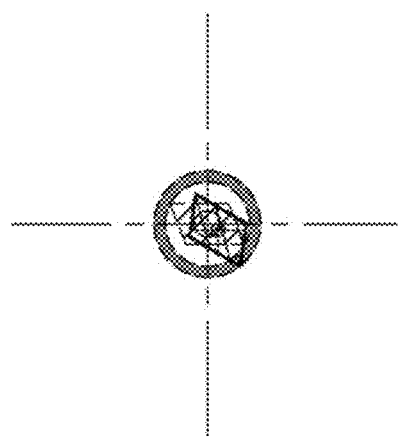

FIGS. 22A-22C illustrate an offset rhomboidal cross-section with two cutting edges on opposite sides (when fully radially constrained). This implementation should be as resistant to torsional inertia as a rectangular cross-section, but may be more useful when designed for use in reciprocation or a reciprocating hand piece.

Figure 23A:
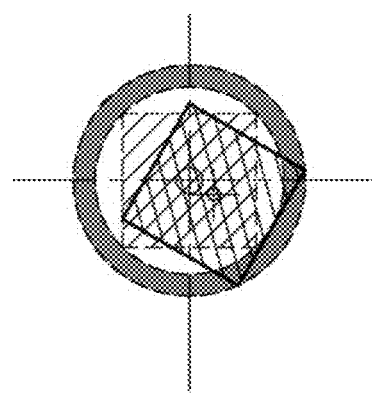
FIGS. 23A-23C depict cross-sectional views of another example endodontic instrument taken at various locations along the body of the instrument and in two conditions of diametrical constraint.
Figure 23B:
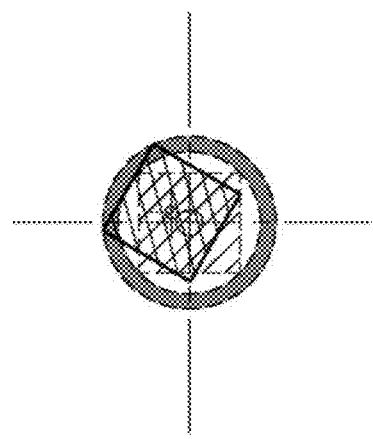
Figure 23C:
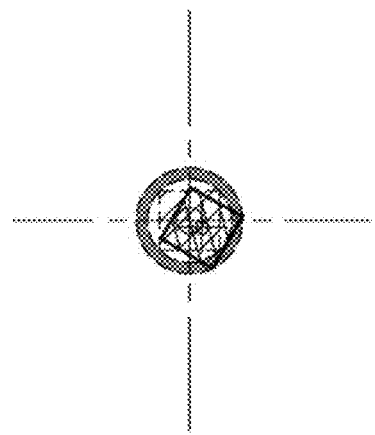

FIGS. 23A-23C illustrate an offset rectilinear cross-section that is square with two cutting edges in the same side. This cross-section may be used singly or in combination with other rectilinear cross-sections that are more rectangular. For example, an instrument may retain a rectangular or rhomboidal cross-section from shank to tip, but become increasing square and end square at the tip. The tip of this would necessarily have greater torsional inertia than a rectangular tip due to the increase in the surface area itself, however, instruments with a square cross-section may be less compliant or flexible than those with rectangular cross-sections given a similar cutting envelop.

Figure 24A:
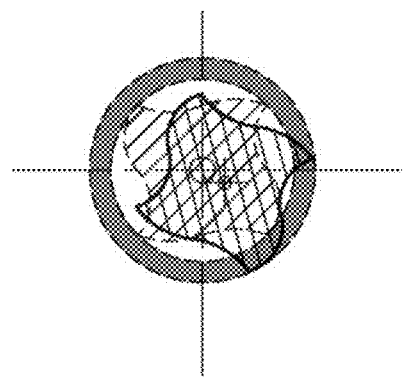
FIGS. 24A-24C depict cross-sectional views of another example endodontic instrument taken at various locations along the body of the instrument and in two conditions of diametrical constraint.
Figure 24B:
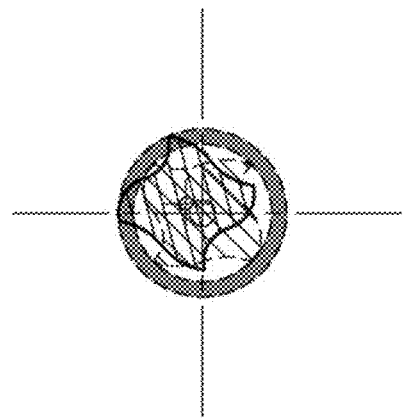
Figure 24C:
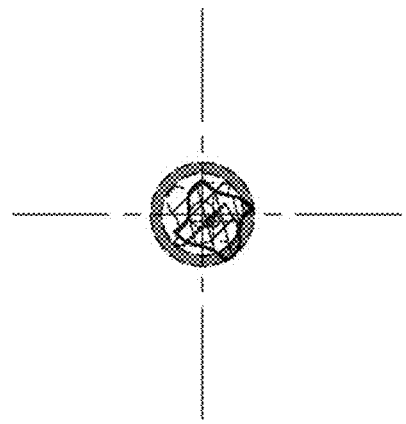

FIGS. 24A-24C illustrate an offset square cross-section with S-shaped spines. An S-shaped spline may be more useful during cutting than a straight spline due to an improved relief angles and clearance angles. As previously mentioned, an instrument with a square cross-section may be have greater torsional inertia, but be less complaint or flexible than a rectangular or rhomboidal cross-sections. A hybridization of a rectangular and/or rhomboidal cross-section and a square cross-section from shank to tip is also envisioned.

Figure 25A:
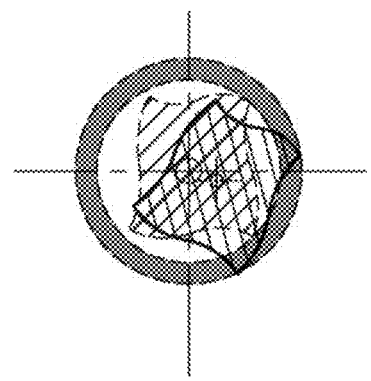
FIGS. 25A-25C depict cross-sectional views of another example endodontic instrument taken at various locations along the body of the instrument and in two conditions of diametrical constraint.
Figure 25B:
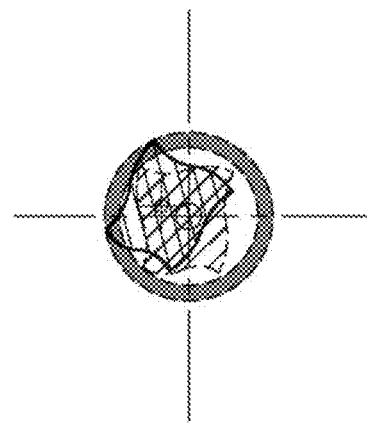
Figure 25C:
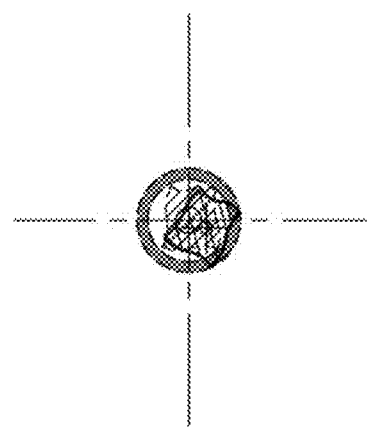

FIGS. 25A-25C illustrate an offset trapezoidal cross-section with two cutting edges on the same side and along the widest cutting flute. As previously mentioned, cross-sections that are both offset and asymmetric have the potential for display excellent precessional cutting ability, but may be slightly predisposed to chatter. Instruments with four cutting edges, however, are more stable than instruments with three cutting edges and display less chatter.

Figure 26A:
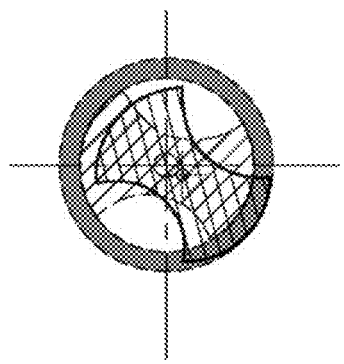
FIGS. 26A-26C depict cross-sectional views of another example endodontic instrument taken at various locations along the body of the instrument and in two conditions of diametrical constraint.
Figure 26B:
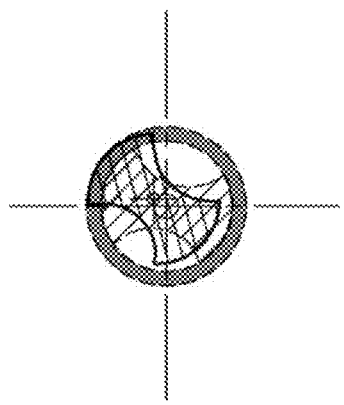
Figure 26C:
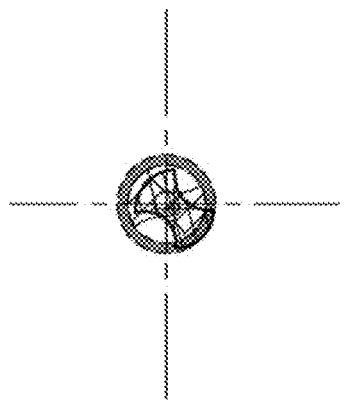

FIGS. 26A-26C illustrate an offset cross-section of a "hatchet" configuration. A cross-section similar to this would be useful is an endodontic cavity preparation where a reciprocating hand piece was employed.

Figure 27A:
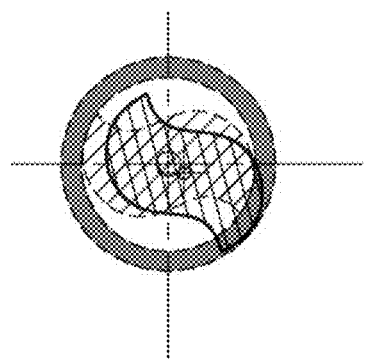
FIGS. 27A-27C depict cross-sectional views of another example endodontic instrument taken at various locations along the body of the instrument and in two conditions of diametrical constraint.
Figure 27B:
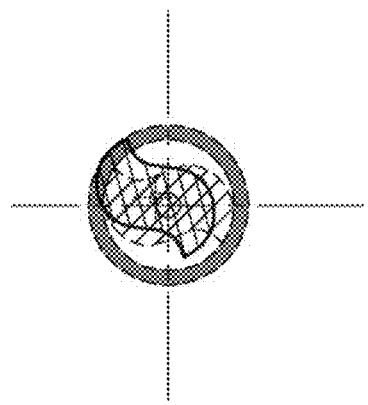
Figure 27C:
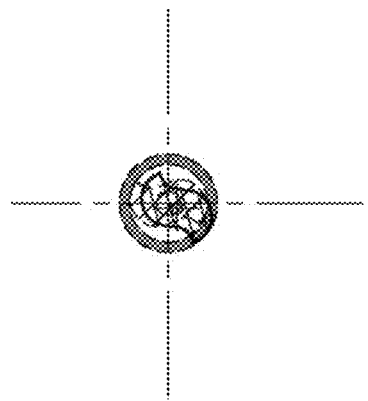

FIGS. 27A-27C illustrate an offset biangular and bisymmetrical cross-section with S-shaped splines. This design may possess all the attributes of a four side cross-section with similar base and height, however, the reduced number of cutting edges may mitigate its cutting ability. This design would also be useful in reciprocation.

Figure 28A:
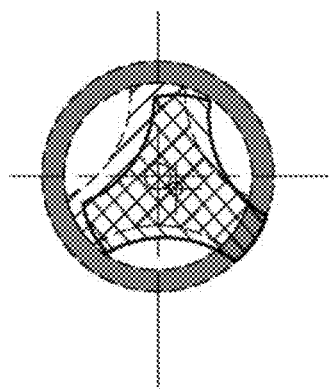
FIGS. 28A-28C depict cross-sectional views of another example endodontic instrument taken at various locations along the body of the instrument and in two conditions of diametrical constraint.
Figure 28B:
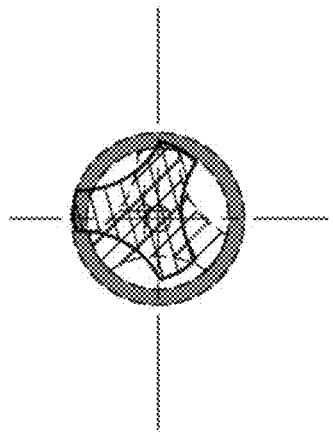
Figure 28C:
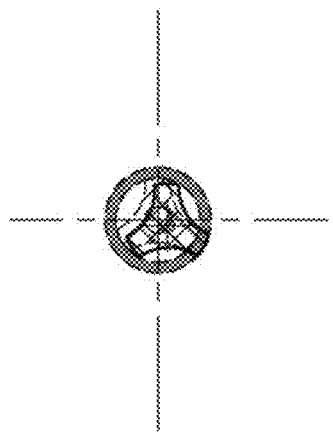

FIGS. 28A-28C illustrate an offset triangular cross-section with broad radial lands. Cross-sections similar to this have also been termed U-endodontic instruments, which refers to the U-shaped clearance areas. The radial lands add bulk to the cross-section and, in turn, will add strength and appreciable resistance to torsional failure. Instruments with cross-section similar to these, however, will have efficient cutting and hauling characteristic due the increased surface tension created by the lands themselves.

Those skilled in the art could envision numerous other permutations of endodontic instrument design, when more than one of the features listed above is combined. They will also recognize that other cross-sections and features could be employed when designing a compressible endodontic instrument, which may be too numerous to mention. For example, instruments with cross-cuts, instruments with non-cutting tips and/or flutes, instruments with constant or variable tapers, instruments with variable or alternating cross-sections etc. The crux of the invention, however, is the same, and that is an endodontic instrument that is compressible with its concomitant advantages as outline above.

In summary, the unique endodontic instrument design characteristic of compressibility is described and claimed herein. Endodontic instrument compressibility is independent of the elasticity or compressibility of the material the endodontic instrument is made from. As discussed above, these characteristics are dependent on a design that has a precessional cutting axis, which is ground in or inscribed into the working portion of the instrument. A "snap shot" taken of the endodontic instrument as it rotates in a root canal shows an instrument proendodontic instrument with multiple crests and troughs (when the instrument is not fully radially compressed). The amplitude of these crests and troughs or unit distance X, translates into the degree of the off-set of the center of mass of the cross-section, which dictates not only the degree of compressibility, but the amount of stored energy available for cutting. Given a specific cross-sectional design, the instrument will be more or less flexible. Smaller cross-sectional areas will render the instrument more flexible than larger cross-sections. Instruments with more crests and troughs per unit working length will be less compressible than instruments with fewer crests and trough. And finally, instruments whereby the longitudinal axis is off-set from tip to shank or shank to tip will also display improved compressibility. In 3-dimensions, these instruments appear to revolve like a spinning top between each node. In Toto, they will appear in 3-dimensional space as a transverse helical and/or mechanical wave.

Those skilled in the art will recognized that given this large number of design variables, a larger set of instruments with differing tip diameters and tapers, both variable and constant are possible. Conversely, a single instrument with appropriate tip size, constant or variable taper and compressibility could be designed to clean and prepare a single root canal (rather than needing multiple instruments of different sizes as is the convention in the field of art currently). Finally, this design will yield an instrument with greater torsional inertia and more resistance to cyclic fatigue than instruments without an offset center of mass as dictated by the theorem for the planar moment of inertia and the parallel axis theorem.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An endodontic instrument for preparing an endodontic cavity space, the endodontic instrument comprising:
    a shank configured for attachment to a motor to drive the endodontic instrument about a first axis; and
    a spirally shaped body having a corkscrew shaped profile extending from the shank by a length, the spirally shaped body being solid and having: (i) a shank end where the spirally shaped body and the shank meet and (ii) a tip end, at least a portion of the spirally shaped body being tapered such that the tip end has a diameter that is less than a diameter of the shank end,
    the spirally shaped body comprising a plurality of transverse cross-sections, each transverse cross-section of the spirally shaped body having a center of mass and comprising:
        four sides; and
        four corners, wherein each corner of the four corners is at a junction of two adjacent sides of the four sides, wherein the four corners are positioned relative to each other such that lines drawn between each pair of adjacent corners of the four corners results in four lines that have no parallelism nor perpendicularity relative to each other and that define acute angles at three corners of the four corners,
        wherein perpendicular distances between an axis passing through the center of mass and two corners of the four corners are equal,
    the spirally shaped body having a center of mass path defined by the centers of mass of the plurality of transverse cross-sections of the spirally shaped body, wherein at least a portion of the center of mass path between the tip end and the shank end spirals around the first axis along a length of the first axis,
    wherein the corkscrew shaped profile of the spirally shaped body configures the endodontic instrument to be radially compressible between: (i) a radially unconstrained configuration in which at least a portion of the center of mass path between the tip end portion and the shank end portion is offset from the first axis and spirals around the first axis along a length of the first axis, and (ii) a radially constrained configuration in which the portion of the center of mass path is more aligned with the first axis than in the radially unconstrained configuration.

2. The endodontic instrument of claim 1, wherein each side of the four sides is S-shaped, concaved, or linear.

3. The endodontic instrument of claim 1, wherein a center of mass of a transverse cross-section of the spirally shaped body at the shank end is offset from the first axis.

4. The endodontic instrument of claim 1, wherein the four sides comprise:
    a first side;
    a second side that is longer than the first side;
    a third side that is longer than the second side; and
    a fourth side that is longer than the third side.

5. The endodontic instrument of claim 4, wherein the spirally shaped body is configured such that when the endodontic instrument is driven within the endodontic cavity space about the first axis and in the radially unconstrained condition, at each transverse section of at least a portion of the length of the spirally shaped body, only two corners of the four corners are in contact with the wall of the endodontic cavity space.

6. The endodontic instrument of claim 5, wherein the only two corners are the pair of adjacent corners between which the third side extends.

7. The endodontic instrument of claim 6, wherein the spirally shaped body is configured such that when the endodontic instrument is driven within the endodontic cavity space about the first axis and in the radially constrained condition, at each transverse section of the at least the portion of the length of the spirally shaped body, only three corners of the four corners are in contact with the wall of the endodontic cavity space.

8. The endodontic instrument of claim 7, wherein the only three corners are corners between which the third side extends and between which the fourth side extends.

9. The endodontic instrument of claim 5, wherein the only two corners of the four corners that are in contact with the wall of the endodontic cavity space are the pair of adjacent corners between which the fourth side extends.

10. The endodontic instrument of claim 9, wherein the spirally shaped body is configured such that when the endodontic instrument is driven within the endodontic cavity space about the first axis and in the radially constrained condition, at each transverse section of the at least the portion of the length of the spirally shaped body, only three corners of the four corners are in contact with the wall of the endodontic cavity space.

11. The endodontic instrument of claim 10, wherein the only three corners are corners between which the third side extends and between which the fourth side extends.

12. The endodontic instrument of claim 4, wherein a first angle defined between the first side and the second side is obtuse, and wherein the acute angles are:
   a second angle defined between the second side and the third side
   a third angle defined between the third side and the fourth side, and
   a fourth angle defined between the fourth side and the first side.

13. The endodontic instrument of claim 1, wherein the portion of the center of mass path that spirals around the first axis extends from the tip end to the shank end.

14. The endodontic instrument of claim 1, wherein ratios of lengths of the four sides remain constant along the length of the spirally shaped body.

15. The endodontic instrument of claim 1, wherein the plurality of transverse cross-sections includes a transverse cross-section at the tip end that has a center of mass that coincides with the first axis.

16. The endodontic instrument of claim 1, wherein the plurality of transverse cross-sections includes a first transverse cross-section and a second transverse cross-section, wherein the first transverse cross-section has a first geometry, and wherein the second transverse cross-section has a second geometry different from the first geometry.

17. The endodontic instrument of claim 1, wherein each transverse cross-section between the first transverse cross-section and the second transverse cross-section has a gradually changing geometry with respect to each other.

18. The endodontic instrument of claim 1, wherein the plurality of transverse cross-sections includes a first transverse cross-section and a second transverse cross-section, wherein a center of mass of the first transverse cross-section is spaced apart from the first axis by a first distance, wherein a center of mass of the second transverse cross-section is spaced apart from the first axis by a second distance, and wherein the first distance is greater than the second distance.

19. The endodontic instrument of claim 1, wherein an offset distance between the center of mass path and the first axis gradually reduces from the shank end to the tip end.

20. The endodontic instrument of claim 19, wherein a tip of the spirally shaped body coincides with the first axis.

21. A method of preparing an endodontic cavity space, the method comprising:
   inserting the endodontic instrument of claim 1 into the endodontic cavity space; and
   rotating the endodontic instrument about the first axis while the endodontic instrument is in the endodontic cavity space, wherein the endodontic instrument is initially in the radially constrained condition by the wall of the endodontic cavity space and then transitions to the radially unconstrained condition as portions of the wall are removed by the instrument.

22. The method of claim 21, wherein the four sides of the spirally shaped body comprise:
   a first side;
   a second side that is longer than the first side;
   a third side that is longer than the second side; and
   a fourth side that is longer than the third side.

23. The method of claim 22, wherein, during the rotating of the endodontic instrument in the radially unconstrained condition, at each transverse section of at least a portion of the length of the spirally shaped body, only two corners of the four corners are in contact with the wall of the endodontic cavity space,
   wherein the only two corners are the pair of adjacent corners between which the third side extends,
   wherein, during the rotating of the endodontic instrument in the radially constrained condition, at each transverse section of the at least the portion of the length of the spirally shaped body, only three corners of the four corners are in contact with the wall of the endodontic cavity space, and
   wherein the only three corners are corners between which the third side extends and between which the fourth side extends.

24. The method of claim 22, wherein, during the rotating of the endodontic instrument in the radially unconstrained condition, at each transverse section of at least a portion of the length of the spirally shaped body, only two corners of the four corners are in contact with the wall of the endodontic cavity space,
   wherein the only two corners are the pair of adjacent corners between which the fourth side extends,
   wherein, during the rotating of the endodontic instrument in the radially constrained condition, at each transverse section of the at least the portion of the length of the spirally shaped body, only three corners of the four corners are in contact with the wall of the endodontic cavity space, and
   wherein the only three corners are corners between which the third side extends and between which the fourth side extends.

25. The method of claim 21, wherein the rotating comprises reciprocating the endodontic instrument.

26. The endodontic instrument of claim 1, wherein the center of mass path is offset from the first axis for these two distinct reasons: (i) because each transverse cross-section is asymmetrical and (ii) because of the corkscrew shaped profile of the spirally shaped body.

27. The endodontic instrument of claim 1, wherein the endodontic instrument is made of or comprises nickel-titanium.

28. The endodontic instrument of claim 1, wherein the spirally shaped body includes cross-cuts.

\* \* \* \* \*